United States Patent
Olson et al.

(10) Patent No.: US 12,454,535 B2
(45) Date of Patent: Oct. 28, 2025

(54) SUBSTITUTED DERIVATIVES OF ISOINDOLES

(71) Applicant: Supernus Pharmaceuticals, Inc., Rockville, MD (US)

(72) Inventors: Gary L. Olson, Mountainside, NJ (US); Bhaskara Rao Nallaganchu, Hillsborough, NJ (US); Yanjun Sun, Kendall Park, NJ (US)

(73) Assignee: Supernus Pharmaceuticals, Inc., Rockville, MD (US)

( * ) Notice: Subject to any disclaimer, the term of this patent is extended or adjusted under 35 U.S.C. 154(b) by 0 days.

(21) Appl. No.: 19/034,407

(22) Filed: Jan. 22, 2025

(65) Prior Publication Data

US 2025/0197412 A1   Jun. 19, 2025

Related U.S. Application Data

(63) Continuation of application No. 18/784,106, filed on Jul. 25, 2024.

(60) Provisional application No. 63/529,077, filed on Jul. 26, 2023.

(51) Int. Cl.
| | |
|---|---|
| C07D 487/04 | (2006.01) |
| A61K 31/4178 | (2006.01) |
| A61K 31/4188 | (2006.01) |
| A61K 31/496 | (2006.01) |
| C07D 233/14 | (2006.01) |
| C07D 403/06 | (2006.01) |
| C07D 405/06 | (2006.01) |

(52) U.S. Cl.
CPC ........ *C07D 487/04* (2013.01); *A61K 31/4178* (2013.01); *A61K 31/4188* (2013.01); *A61K 31/496* (2013.01); *C07D 233/14* (2013.01); *C07D 403/06* (2013.01); *C07D 405/06* (2013.01)

(58) Field of Classification Search
CPC .. C07D 487/04; C07D 233/14; C07D 403/06; C07D 405/06; A61K 31/4178; A61K 31/4188; A61K 31/496
See application file for complete search history.

(56) References Cited

U.S. PATENT DOCUMENTS

| | | | | |
|---|---|---|---|---|
| 3,879,415 | A * | 4/1975 | Metlesics | A61K 31/00 544/335 |
| 2004/0254182 | A1* | 12/2004 | Mulvihill | C07D 211/90 514/227.8 |
| 2009/0318520 | A1* | 12/2009 | Kovacs | A61K 45/06 514/393 |

OTHER PUBLICATIONS https://www.lawinsider.com/dictionary/lower-alkyl (Year: 2025).*
CAS STNext—(Chemical modification of drugs into labile derivatives with enhanced properties. Mark Joseph Mulvihill, Steven Howard Shaber. AN: [2004: 1156800]; STN: [https://www.cas.org], US 2004/0254182 A1) (Year: 2004).*
CAS SciFinder (Chemical modification of drugs into labile derivatives with enhanced properties. Mark Joseph Mulvihill, Steven Howard Shaber.AN 2004:1080693; US 2004/0254182 A1) (Year: 2004).*
Perez-Estrada et al., "Towards taxane analogues synthesis by dienyne ring closing metathesis," Org. Chem. Front., 2016, 3(10):1331-1336.
Yang et al., "Enzyme-mediated hydrolytic activation of prodrugs," Acta Pharmaceutica Sinica B, 2011, 1(3):143-159.

* cited by examiner

*Primary Examiner* — Clinton A Brooks
*Assistant Examiner* — Josmalen M. Ramos-Lewis
(74) *Attorney, Agent, or Firm* — Foley & Lardner LLP

(57) ABSTRACT

Provided are substituted derivatives of 5-(4-chlorophenyl)-2,3-dihydroimidazo[1,2-b]isoindol-5-ol having Formula (I):

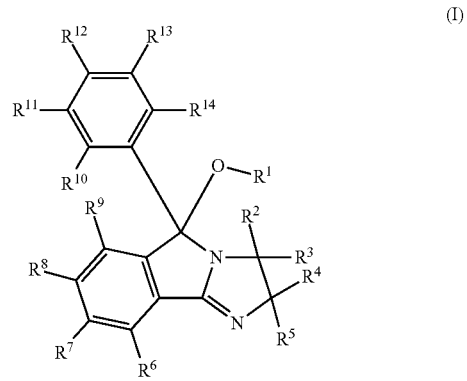

as well as their stereoisomers and their pharmaceutically acceptable salts. Such substituted derivatives may be used, for example, in pharmaceutical compositions for the treatment of central nervous system diseases or disorders. In addition, methods of making such substituted derivatives are also provided.

5 Claims, 16 Drawing Sheets

SUBSTITUTED DERIVATIVES OF ISOINDOLES

CROSS-REFERENCE TO RELATED APPLICATIONS

This application is a Continuation of U.S. application Ser. No. 18/784,106, filed Jul. 25, 2024, which claims the benefit of priority to U.S. Provisional Patent Application No. 63/529,077, filed on Jul. 26, 2023, the contents of which are incorporated herein by reference in their entirety.

FIELD

The present technology generally relates to substituted derivatives of isoindoles, analogs of isoindoles, prodrugs of isoindoles, and their uses in pharmaceutical compositions for the treatment of diseases or disorders including the treatment of central nervous system ("CNS") disorders.

BACKGROUND

The compound 5-(4-chlorophenyl)-2,3-dihydroimidazo[1,2-b]isoindol-5-ol is a sympathomimetic amine that stimulates the central nervous system ("CNS"), increasing heart rate, blood pressure, and decreasing appetite. 5-(4-Chlorophenyl)-2,3-dihydroimidazo[1,2-b]isoindol-5-ol acts as a reuptake inhibitor of norepinephrine, dopamine, and serotonin. However, treatment with 5-(4-chlorophenyl)-2,3-dihydroimidazo[1,2-b]isoindol-5-ol has been associated with numerous side effects including hypertension, anorexia, gastrointestinal discomfort, nervousness, nausea, constipation, urinary retention, angioneurotic edema, vomiting, tremor, xerostomia, insomnia or difficulty sleeping, and EKG and EEG abnormalities.

Indoline derivatives have previously been disclosed in the art. A prior disclosure indicated that isoindoles can be used for the treatment or prevention of neurobehavioral disorders (see U.S. 2009/0318520). However, previously disclosed syntheses of these 5-(4-chlorophenyl)-2,3-dihydroimidazo[1,2-b]isoindol-5-ol analogs, prodrugs, and derivatives suffer from a number of deficiencies, such as low reaction yield, reaction byproducts, difficult isolation of the product, and impurities in the resulting product. Effective elimination or removal of impurities, especially those impurities possessing genotoxicity or other toxicities, is critical to render safe pharmaceutical products.

The present invention addresses the side effects of the 5-(4-chlorophenyl)-2,3-dihydroimidazo[1,2-b]isoindol-5-ol compound by providing derivatives, prodrugs, and analogs that retain the pharmacologic properties of 5-(4-chlorophenyl)-2,3-dihydroimidazo[1,2-b]isoindol-5-ol. The methods of synthesizing the compounds of the present invention, additionally provide a solution to the deficiencies associated with the synthesis of the 5-(4-chlorophenyl)-2,3-dihydroimidazo[1,2-b]isoindol-5-ol analogs, prodrugs, and derivatives.

Prodrugs are a class of derivatives that in many instances have little or no pharmacological activity, which are converted in vivo to therapeutically active compounds. In some instances, the prodrug itself may possess biological activity. Prodrug activation may occur by enzymatic or non-enzymatic cleavage of the temporary bond between the carrier and the drug molecule, or a sequential or simultaneous combination of both.

Prodrugs may provide compounds with superior physicochemical and/or pharmaceutical properties as compared to the parent molecule, which may overcome barriers for solubilization, absorption, distribution, metabolism, excretion, and toxicity (ADMET). These prodrugs may show improved absorption, solubility, permeability, stability, and pharmacokinetic performance. The prodrug may exhibit a longer half-life as compared to the parent molecule. Prodrugs may be prepared by coupling of the parent drug at reactive sites with prodrug moieties that modify the parent drug and are convertible from the prodrug to the parent drug by enzymatic or non-enzymatic processes. The reactive sites on the drug may include, but are not limited to, hydroxyl, carboxyl, amino, heteroamino, thiol, amide, and related reactive groups. These are coupled to form prodrugs with alkyl, aralkyl, acyl, carbamoyl, acyloxy, and moieties that have combined groups such as diacylacetals or acylhydroxyalkyl, groups. Other examples are described in the literature (see Yang, Liu, et al., Acta Pharmaceutica Sinica B 2011: 1(3), 143-159 and references described therein). Additional methods for synthesizing prodrugs of 5-(4-chlorophenyl)-2,3-dihydroimidazo[1,2-b]isoindol-5-ol would be beneficial.

Drug analogs are a class of compounds sharing chemical and/or therapeutic similarities with an existing pharmaceutical. Drug analogs generally present in three categories: (1) analogs with chemical and pharmacological similarity; (2) analogs with only chemical similarity; and (3) analogs with similar pharmacological properties but different chemical structures. Although the analog may have similar physical properties, the analog may have distinct chemical and biological properties. Alternatively, the analog may share chemical and therapeutic similarities with the existing drug. Analogs of a compound may provide additional pharmacological agents for treatment of disorders with varying properties that may translate to additional efficacy, reduced toxicity, or increased tolerance.

The present inventors synthesized novel derivatives of isoindoles with the derivatization occurring at several locations. In one approach, the derivatization is of the hydroxy group on the 5-(4-chlorophenyl)-2,3-dihydroimidazo[1,2-b]isoindol-5-ol. In other approaches, the derivatization occurs at the amine group of the imidazoline ring of the keto tautomer. The newly synthesized 5-(4-chlorophenyl)-2,3-dihydroimidazo[1,2-b]isoindol-5-ol derivatives can be used in pharmaceutical compositions and for the treatment of diseases or disorders including the treatment of CNS disorders.

SUMMARY

In one aspect, the present technology relates to isoindoline derivatives according to an isoindole derivative of Formula I, a stereoisomer thereof, or a pharmaceutically acceptable salt thereof:

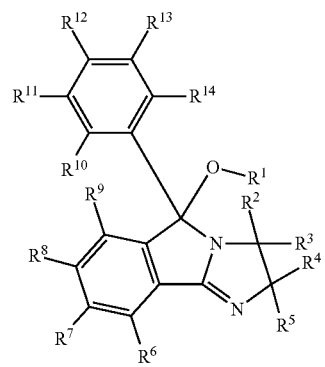

(I)

In Formula I, $R^1$ is an alkyl group, an alkenyl group, an aralkyl group, an ether group, an ester group, a cinnamyl group, a heteroalkyl group or a heterocycloalkyl group;

$R^2$-$R^{14}$ are each independently H, alkyl, alkoxy, F, Cl, Br, $CF_3$ or I; In some embodiments, the isoindoline derivative of Formula I is other than the isoindoline derivative of formula I-6:

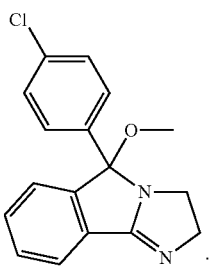
(I-6)

In another embodiment, $R^1$ is an alkyl group, an alkenyl group, an aralkyl group, an alkoxyalkyl group, a carboxyalkyl ester group, a cinnamyl group, a heteroalkyl group or a heterocycloalkyl group; and $R^2$-$R^5$ are each independently H or alkyl; and $R^6$-$R^{14}$ are each independently H, alkyl, alkoxy, F, Cl, Br, $CF_3$ or I. In a preferred embodiment, the isoindoline derivative of formula I is not of formula I-6:

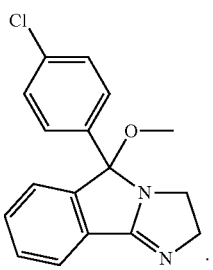
(I-6)

In some embodiments, $R^1$ is an alkane. In some embodiments, the alkane is —$CH_3$, —$CH_2$—$CH_3$, or —$CH_2$—CH$(CH_3)_2$. In some embodiments, the isoindoline derivative is:

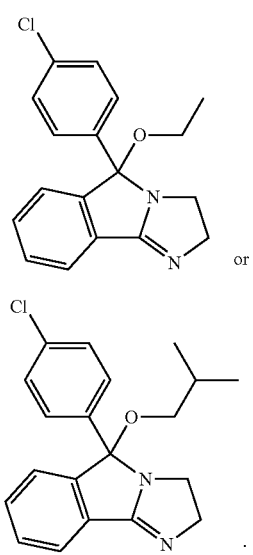
(I-8) or (I-10)

In some embodiments, $R^1$ is an alkene. In some embodiments, the alkene is —$CH_2$—CH=$CH_2$, —$CH_2$—CH=C$(CH_3)_2$, —$CH_2$—CH=C$(CH_3)$—$CH_2$—$CH_2$—CH=C$(CH_3)_2$, or —$CH_2$—CH=C$(CH_3)$—$CH_2$—$CH_2$—CH=C$(CH_3)$—$CH_2$—$CH_2$—CH=C$(CH_3)_2$. In some embodiments, the isoindoline derivative is:

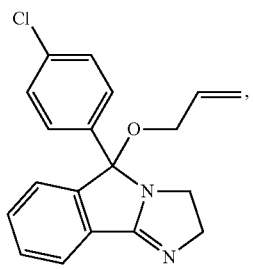
(I-3)

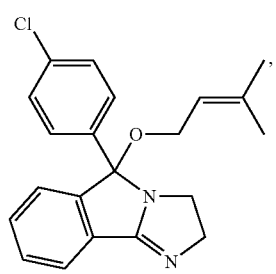
(I-9)

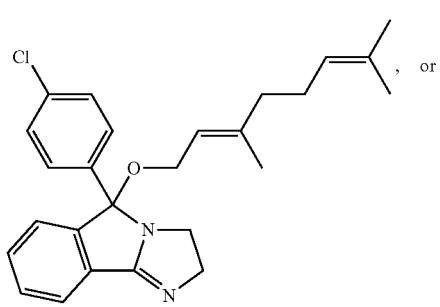
(I-11), or

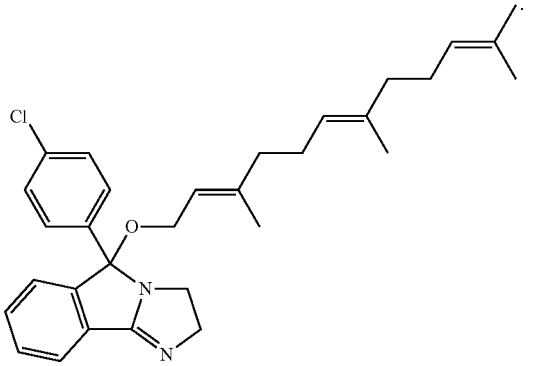
(I-13)

In some embodiments, R¹ comprises —CH═CH—. In some embodiments, the isoindoline derivative is:
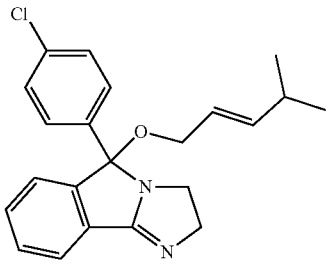
(I-17)
In some embodiments, R¹ comprises a cinnamyl group. In some embodiments, the isoindoline derivative is:
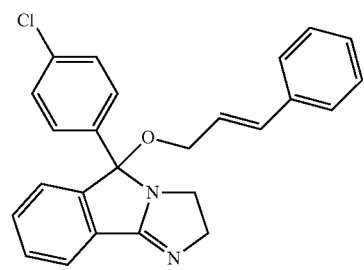
(I-21)
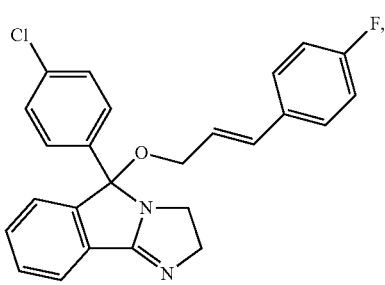
(I-22)
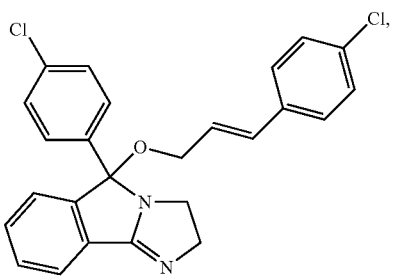
(I-23)
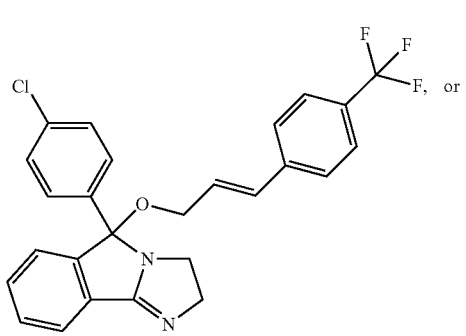
(I-18)
, or
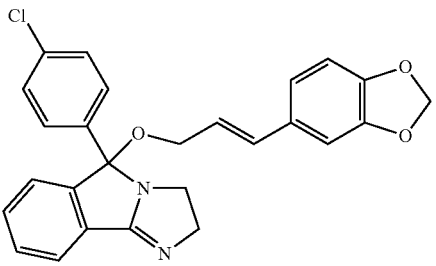
(I-20)
In some embodiments, R¹ comprises a benzyl group. In some embodiments, the isoindoline derivative is:
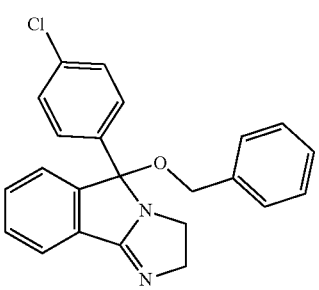
(I-1)
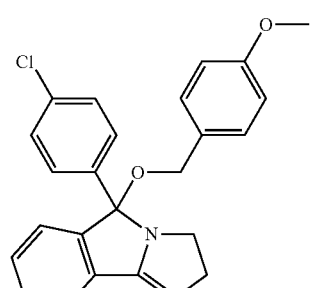
(I-2)
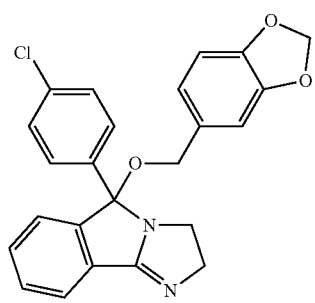
(I-7)
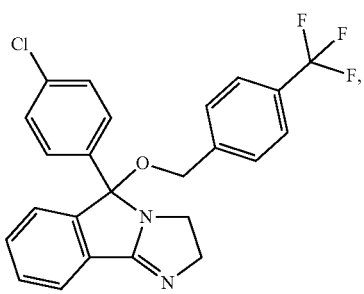
(I-14)

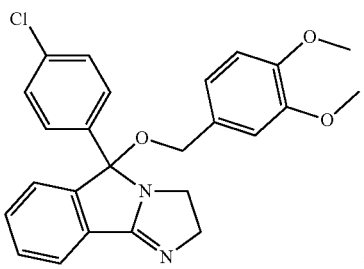

(I-15)

, or

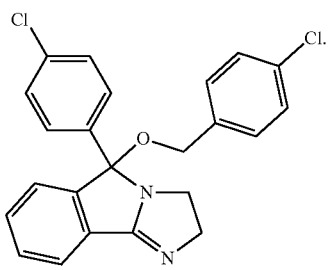

(I-16)

In some embodiments, R¹ comprises an ether group. In some embodiments, the isoindoline derivative is:

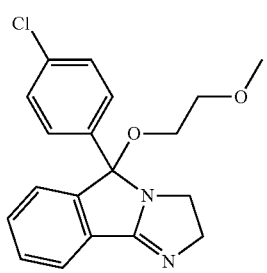

(I-4)

or

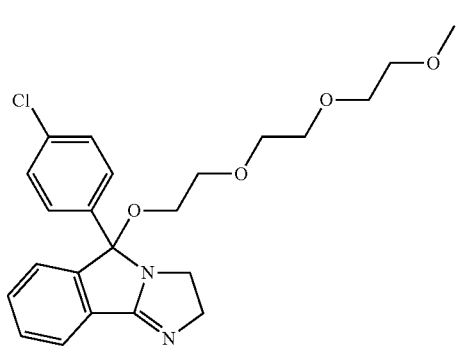

(I-12)

In some embodiments, R¹ comprises an ester group. In some embodiments, the isoindoline derivative is:

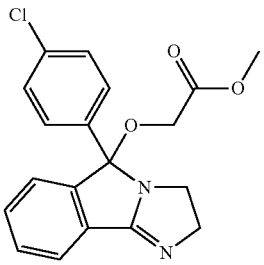

(I-5)

In some embodiments, R¹ comprises a dioxolane group. In some embodiments, the isoindoline derivative is:

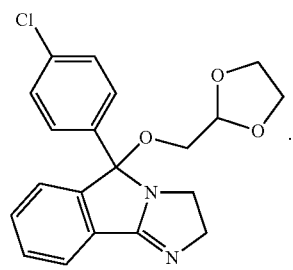

(I-19)

In some embodiments, the isoindoline derivative is selected from the group consisting of: 5-(benzyloxy)-5-(4-chlorophenyl)-2,5-dihydro-3H-imidazo[2,1-a]isoindole (I-1), 5-(4-chlorophenyl)-5-((4-methoxybenzyl)oxy)-2,5-dihydro-3H-imidazo[2,1-a]isoindole (I-2), 5-(allyloxy)-5-(4-chlorophenyl)-2,5-dihydro-3H-imidazo[2,1-a]isoindole (I-3), 5-(4-chlorophenyl)-5-(2-methoxyethoxy)-2,5-dihydro-3H-imidazo[2,1-a]isoindole (I-4), methyl 2-((5-(4-chlorophenyl)-2,5-dihydro-3H-imidazo[2,1-a]isoindol-5-yl)oxy)acetate (I-5), 5-(benzo[d][1,3]dioxol-5-ylmethoxy)-5-(4-chlorophenyl)-2,5-dihydro-3H-imidazo[2,1-a]isoindole (I-7), 5-(4-chlorophenyl)-5-ethoxy-2,5-dihydro-3H-imidazo[2,1-a]isoindole (I-8), 5-(4-chlorophenyl)-5-((3-methylbut-2-en-1-yl)oxy)-2,5-dihydro-3H-imidazo[2,1-a]isoindole (I-9), 5-(4-chlorophenyl)-5-isobutoxy-2,5-dihydro-3H-imidazo[2,1-a]isoindole (I-10), (E)-5-(4-chlorophenyl)-5-((3,7-dimethylocta-2,6-dien-1-yl)oxy)-2,5-dihydro-3H-imidazo[2,1-a]isoindole (I-11), 5-(4-chlorophenyl)-5-(2-(2-(2-methoxyethoxy)ethoxy)ethoxy)-2,5-dihydro-3H-imidazo[2,1-a]isoindole (I-12), 5-(4-chlorophenyl)-5-(((2E,6E)-3,7,11-trimethyldodeca-2,6,10-trien-1-yl)oxy)-2,5-dihydro-3H-imidazo[2,1-a]isoindole (I-13), 5-(4-chlorophenyl)-5-((4-(trifluoromethyl)benzyl)oxy)-2,5-dihydro-3H-imidazo[2,1-a]isoindole (I-14), 5-(4-chlorophenyl)-5-((3,4-dimethoxybenzyl)oxy)-2,5-dihydro-3H-imidazo[2,1-a]isoindole (I-15), 5-((4-chlorobenzyl)oxy)-5-(4-chlorophenyl)-2,5-dihydro-3H-imidazo[2,1-a]isoindole (I-16), (E)-5-(4-chlorophenyl)-5-((4-methylpent-2-en-1-yl)oxy)-2,5-dihydro-3H-imidazo[2,1-a]isoindole (I-17), (E)-5-(4-chlorophenyl)-5-((3-(4-(trifluoromethyl)phenyl)allyl)oxy)-2,5-dihydro-3H-imidazo[2,1-a]isoindole (I-18), 5-((1,3-dioxolan-2-yl)methoxy)-5-(4-chlorophenyl)-2,5-dihydro-3H-imidazo[2,1-a]isoindole (I-19), (E)-5-((3-(benzo[d][1,3]dioxol-5-yl)allyl)oxy)-5-(4-chlorophenyl)-2,5-dihydro-3H-imidazo[2,1-a]isoindole (I-20), 5-(4-chlorophenyl)-5-(cinnamyloxy)-2,5-dihydro-3H-imidazo[2,1-a]isoindole (I-21), (E)-5-(4-chlorophenyl)-5-((3-(4-fluorophenyl)allyl)

oxy)-2,5-dihydro-3H-imidazo[2,1-a]isoindole (I-22), and (E)-5-(4-chlorophenyl)-5-((3-(4-chlorophenyl)allyl)oxy)-2,5-dihydro-3H-imidazo[2,1-a]isoindole (I-23).

In some embodiments, the present technology relates to isoindoline derivatives according to an isoindole derivative of Formula II, a stereoisomer thereof, or a pharmaceutically acceptable salt thereof:

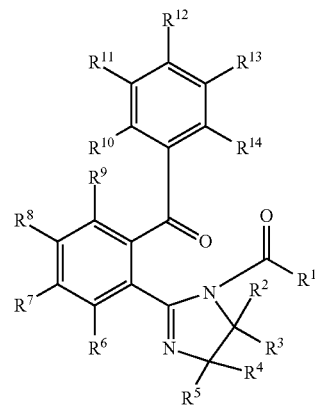

(II)

In Formula II, $R^1$ is a piperazinyl group, an alkyl group, an alkenyl group, a benzyl group, a phenyl group, or an amino acid residue derivative; and $R^2$-$R^{14}$ are each independently H, F, Cl, Br, or I.

In some embodiments, $R^1$ is a piperazine group. In some embodiments, the isoindoline derivative is:

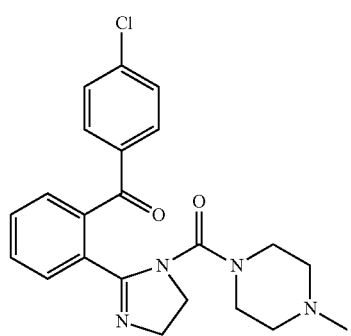

(II-6)

In some embodiments, $R^1$ is an alkene. In some embodiments, the alkene is —CH=C(CH$_3$)$_2$ or —CH=C(CH$_3$)—CH$_2$—CH$_2$—CH=C(CH$_3$)$_2$. In some embodiments, the isoindoline derivative is:

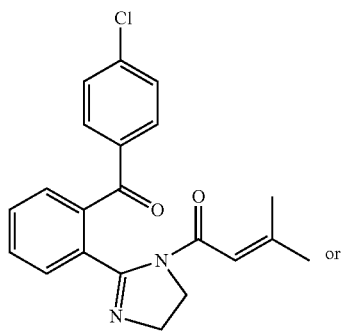

(II-7)

or

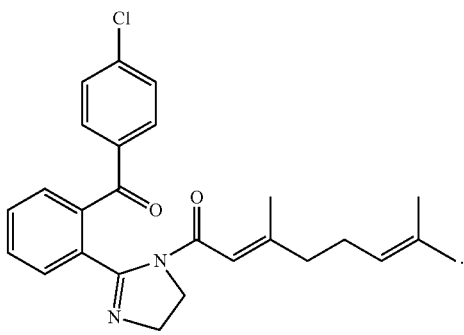

(II-9)

In some embodiments, $R^1$ comprises a benzyl group or a phenyl group. In some embodiments, the isoindoline derivative is:

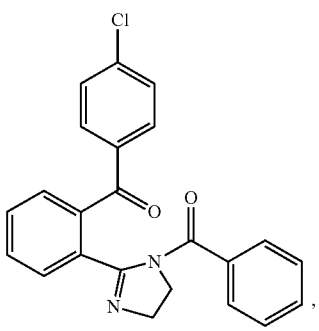

(II-1)

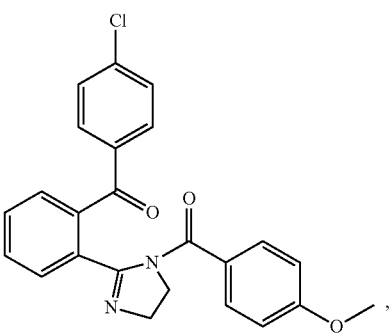

(II-2)

(II-3)

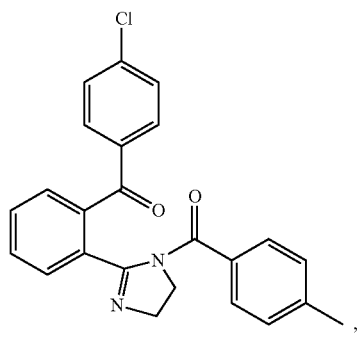

(II-4)

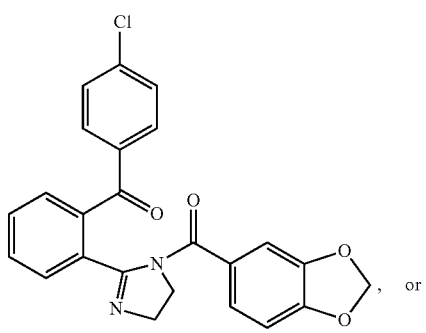
, or (II-8)

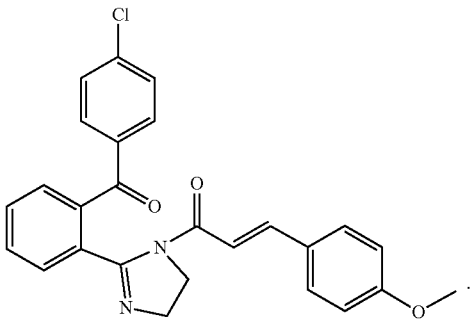
.

In some embodiments, R¹ is an amino acid residue derivative. In some embodiments, the amino acid residue derivative has a hydrophobic side chain. In some embodiments, the amino acid residue derivative with a hydrophobic side chain is a valine derivative. In some embodiments, the valine derivative has a tert-butoxycarbonyl protecting group. In some embodiments, the isoindoline derivative is:

(II-5)

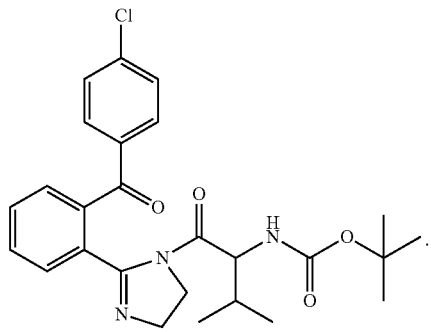
.

In some embodiments, the isoindoline derivative is selected from the group consisting of: (2-(1-benzoyl-4,5-dihydro-1H-imidazol-2-yl)phenyl)(4-chlorophenyl)methanone (II-1), (2-(2-(4-chlorobenzoyl)phenyl)-4,5-dihydro-1H-imidazol-1-yl)(4-methoxyphenyl)methanone (II-2), (2-(2-(4-chlorobenzoyl)phenyl)-4,5-dihydro-1H-imidazol-1-yl)(p-tolyl)methanone (II-3), benzo[d][1,3]dioxol-5-yl(2-(2-(4-chlorobenzoyl)phenyl)-4,5-dihydro-1H-imidazol-1-yl)methanone (II-4), tert-butyl (1-(2-(2-(4-chlorobenzoyl)phenyl)-4,5-dihydro-1H-imidazol-1-yl)-3-methyl-1-oxobutan-2-yl)carbamate (II-5), (2-(2-(4-chlorobenzoyl)phenyl)-4,5-dihydro-1H-imidazol-1-yl)(4-methylpiperazin-1-yl)methanone (II-6), 1-(2-(2-(4-chlorobenzoyl)phenyl)-4,5-dihydro-1H-imidazol-1-yl)-3-methylbut-2-en-1-one (II-7), (E)-1-(2-(2-(4-chlorobenzoyl)phenyl)-4,5-dihydro-1H-imidazol-1-yl)-3-(4-methoxyphenyl)prop-2-en-1-one (II-8), and (E)-1-(2-(2-(4-chlorobenzoyl)phenyl)-4,5-dihydro-1H-imidazol-1-yl)-3,7-dimethylocta-2,6-dien-1-one (II-9).

In some embodiments, the present technology relates to dimeric isoindoline derivatives according to an isoindole derivative of Formula III, a stereoisomer, or a pharmaceutically acceptable salt thereof:

(III)

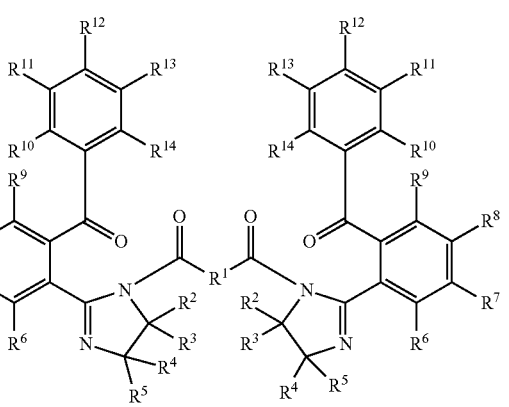

In Formula III, R¹ is an alkyl group, an alkenyl group, an aryl group, an ether group, an ester group, or a heteroaryl group; and $R^2$-$R^{14}$ are each independently H, F, Cl, Br, or I. In another embodiment, in the Formula III derivatives, R¹ is an alkyl group, an alkenyl group, an aryl group, or a heteroaryl group; and $R^2$-$R^{14}$ are each independently H, F, Cl, Br, or I.

In any of the above embodiments, $R^{12}$ may be Cl. In any of the above embodiments, $R^2$-$R^{11}$, $R^{13}$-$R^{14}$ may each be H.

In some embodiments, $R^1$ is an alkane. In some embodiments, the dimeric isoindoline derivative is:

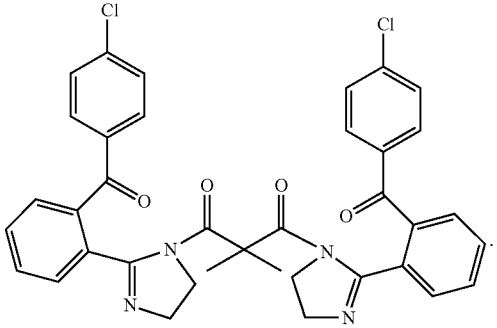

(III-1)

In some embodiments, the dimeric isoindoline derivative is 1,3-bis(2-(2-(4-chlorobenzoyl)phenyl)-4,5-dihydro-1H-imidazol-1-yl)-2,2-dimethylpropane-1,3-dione (III-1).

In some aspects, a composition is provided that comprises an isoindole derivative of Formula I, II, or III, a stereoisomer thereof, or a pharmaceutically acceptable salt thereof, and at least one pharmaceutically acceptable excipient or carrier.

In some aspects, the treatment of disease or disorders, including the treatment of central nervous system ("CNS") disorders, is provided by administering to a subject in need thereof a therapeutically effective amount of a compound of Formula I, II, or III, a stereoisomer thereof, or a pharmaceutically acceptable salt thereof.

In some aspects, the present invention relates to the use of a therapeutically effective amount of a compound of Formula I, II, or III, a stereoisomer thereof, or a pharmaceutically acceptable salt thereof, or the use of a composition comprising a therapeutically effective amount of a compound of Formula I, II, or III, a stereoisomer thereof, or a pharmaceutically acceptable salt thereof, for the treatment of CNS disorders in a subject in need thereof.

In some aspects, a method is provided for making an isoindole derivative of Formula I, II, or III, a stereoisomer thereof, or a pharmaceutically acceptable salt thereof, comprising contacting an isoindole molecule or a salt thereof with a reactant suitable for forming the isoindole derivative of Formula I, II, or III, a stereoisomer thereof, or a pharmaceutically acceptable salt thereof.

DETAILED DESCRIPTION

Figure 1:
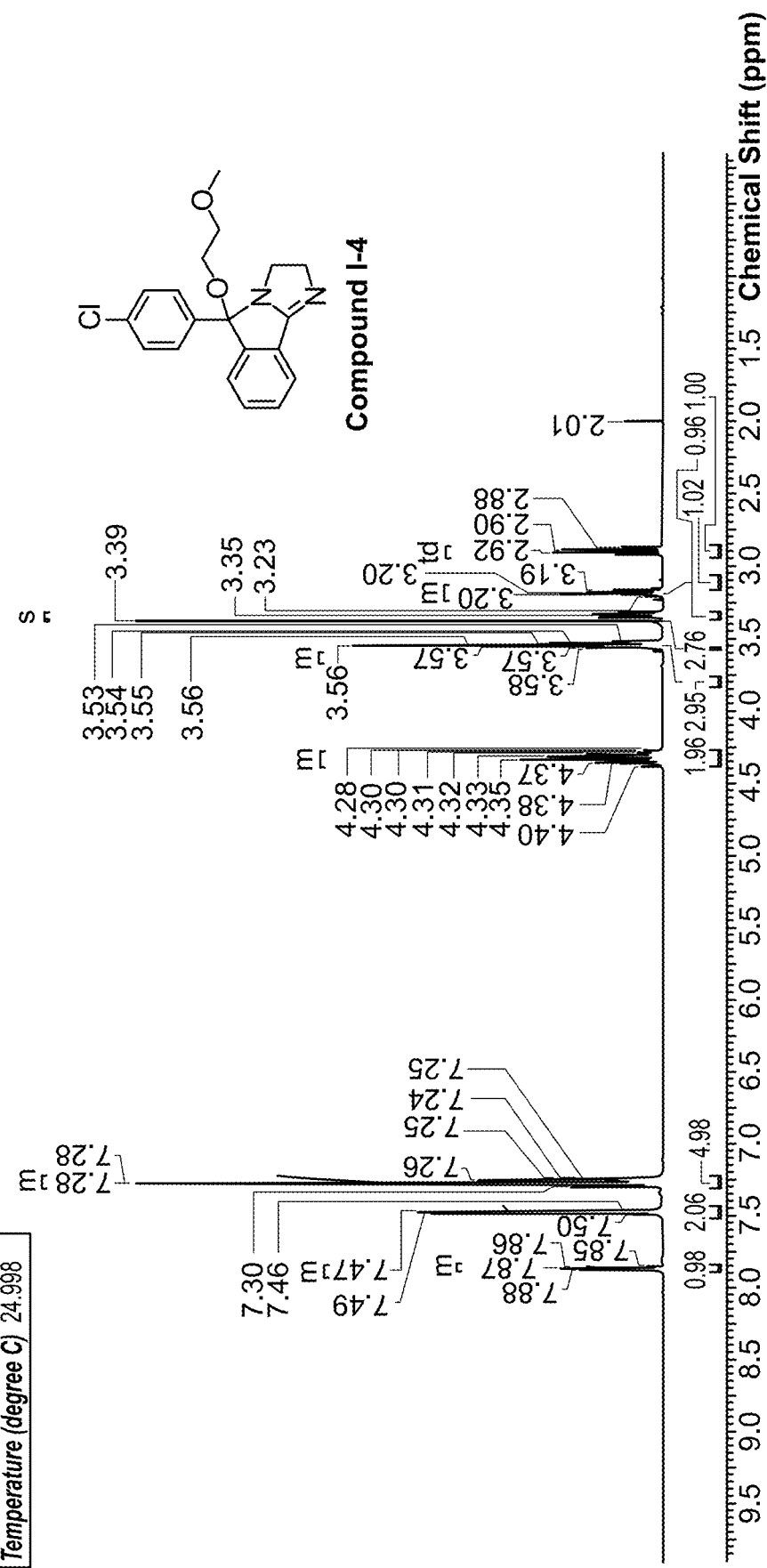
FIG. 1. shows the $^1$H and $^{13}$C NMR spectra of I-4 from Example 2.
Figure 1:
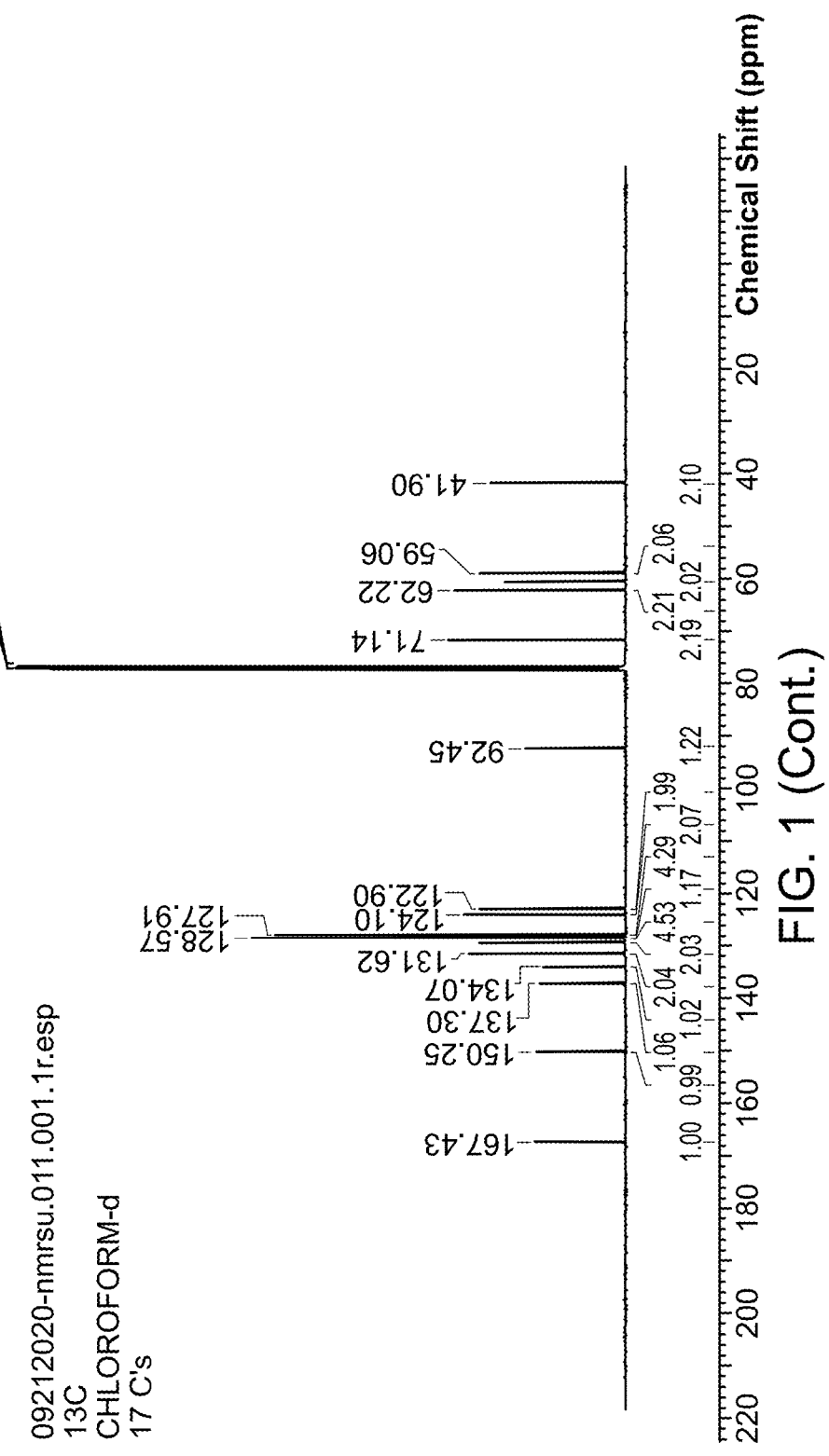

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein merely intended to serve as shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Generally, reference to a certain element such as hydrogen or H is meant to include all isotopes of that element. For example, if an R group is defined to include hydrogen or H, it also includes deuterium and tritium. Compounds comprising radioisotopes such as tritium, $C^{14}$, $P^{32}$, and $S^{35}$ are thus within the scope of the present technology. Procedures for inserting such labels into the compound of the present technology will be readily apparent to those skilled in the art based on the disclosure herein.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include, but are not limited to: halogens (i.e., F, Cl, Br, and I); hydroxyls; alkyls; alkenyls; alkynyls; cycloalkyls; aryls; alkoxy, alkenoxy, aryloxy, aralkyloxy, heterocyclyl, heterocyclylalkyl, heterocyclyloxy, and heterocyclylalkoxy groups; carbonyls (oxo); carboxylates; esters; urethanes; oximes; hydroxylamines; alkoxyamines; aralkoxyamines; thiols; sulfides; sulfoxides; sulfones; sulfonyls; pentafluorosulfanyl (i.e., $SF_5$), sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include, but are not limited to, methyl, ethyl, n-propyl, n-butyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein, the term haloalkyl is an alkyl group having one or more halo groups. In some embodiments, haloalkyl refers to a perhaloalkyl group.

Cycloalkyl groups are cyclic alkyl groups such as, without limitation, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, without limitation: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, C=$CH_2$, or C=$CHCH_3$.

Alkynyl groups are hydrocarbon moieties having 2 to about 20 carbon atoms, and further including at least one triple bond. In some embodiments alkynyl groups have from 1 to 12 carbons, or, typically, from 1 to 8 carbon atoms. Alkynyl groups may be substituted or unsubstituted. Alkynyl groups include, for instance, ethyne, propyne, butyne, pentyne, hexyne, heptyne, octyne, nonyne, among others.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, "aralkyl" refers to a moiety of the formula —$R^bR^c$ where $R^b$ is an alkylene group and $R^c$ is an aryl group as defined herein. Exemplary aralkyl groups include, but are not limited to, benzyl, phenylethyl, 3-(3-chlorophenyl)-2-methylpentyl, and the like. The term "optionally substituted aralkyl" means the aryl group is optionally substituted with one or more, typically, one to three, and often one or two, substituents. Exemplary substituents for the aryl group include, but are not limited to, alkyl, haloalkyl, thioalkyl, heteroalkyl, halo, nitro, cyano, cycloalkyl, aryl, heteroaryl, heterocyclyl, haloalkoxy, aryloxy, heteroaryloxy, etc.

As used herein, "heteroaryl" refers to a cyclic aromatic compound that contains one or more heteroatoms selected from the group consisting of nitrogen, oxygen, and sulfur in the ring. The "heteroaryl" group can be made up of two or more fused rings (rings that share two adjacent atoms). When the heteroaryl is a fused ring system, then the ring that is connected to the rest of the molecule has a fully delocalized pi-electron system. The other ring(s) in the fused ring system may or may not have a fully delocalized pi-electron system. Examples of heteroaryl rings include, without limitation, furan, thiophene, phthalazinone, pyrrole, oxazole, thiazole, imidazole, pyrazole, isoxazole, isothiazole, triazole, thiadiazole, pyridine, pyridazine, pyrimidine, pyrazine and triazine.

Wherever "hetero" is used it is intended to mean a group as specified, such as an alkyl or an aryl group, where at least one carbon atom has been replaced with a heteroatom selected from the group consisting of nitrogen, oxygen, and sulfur.

As used herein, "heterocycloalkyl," refers to a ring having in the ring system one or more heteroatoms independently selected from nitrogen, oxygen and sulfur. The ring may also contain one or more double bonds provided that they do not form a fully delocalized pi-electron system in the rings. The ring defined herein can be a stable 3- to 18-membered ring that consists of carbon atoms and from one to five heteroatoms selected from the group consisting of nitrogen, oxygen, and sulfur. Heterocycloalkyl groups of the presently disclosed compounds may be unsubstituted or substituted. When substituted, the substituent(s) may be one or more groups independently selected from the group consisting of halogen, hydroxy, protected hydroxy, cyano, nitro, alkyl, alkoxy, acyl, acyloxy, carboxy, protected carboxy, amino, protected amino, carboxamide, protected carboxamide, alkylsulfonamido and trifluoromethane-sulfonamido. The "heterocycloalkyl" group can be made up of two or more fused rings (rings that share two adjacent carbon atoms). When the heterocycloalkyl is a fused ring system, then the ring that is connected to the rest of the molecule is a heterocycloalkyl as defined above. The other ring(s) in the fused ring system may be a cycloalkyl, a cycloalkenyl, an aryl, a heteroaryl, or a heterocycloalkyl.

As used herein, "alkoxy" refers to an alkyl group attached to an oxygen (—O-alkyl-). "Alkoxy" groups also include an alkenyl group attached to an oxygen ("alkenyloxy") or an alkynyl group attached to an oxygen ("alkynyloxy") groups. Exemplary alkoxy groups include, but are not limited to, groups with an alkyl, alkenyl or alkynyl group of 1-22, 1-8, or 1-6 carbon atoms, referred to herein as ($C_1$-$C_{22}$)alkoxy, ($C_1$-$C_8$)alkoxy, and ($C_1$-$C_6$)alkoxy, respectively. Exemplary alkoxy groups include, but are not limited to methoxy, ethoxy, etc.

As used herein, "ether" refers to the structure —$R_1$—O—$R_2$—, where $R_1$ and $R_2$ are independently alkyl, alkenyl, aryl, cycloalkyl, heterocyclyl, heteroaryl, or heterocycloalkyl. Exemplary ethers include, but are not limited to, alkoxyalkyl and alkoxyaryl groups. Ethers also includes polyethers, e.g., where one or both of $R_1$ and $R_2$ are ethers.

The term "carboxylate" as used herein refers to the conjugate base of a carboxylic acid with the chemical formula —COO—.

The term "ester" as used herein refers to —COOR$^b$— and C(O)O-G groups. R$^b$ is a substituted or unsubstituted alkyl, cycloalkyl, alkenyl, alkynyl, aryl, aralkyl, hetetocyclyalkyl or heterocyclyl group as defined herein. G is a carboxylate protecting group. Carboxylated protecting groups are well known to one of ordinary skill in the art. An extensive list of carboxylate protecting groups may be found in Protective Groups in Organic Synthesis, Greene, T. W.; Wuts, P. G. M., John Wiley & Sons, New York, NY (3$^{rd}$ Edition, 1999) which can be added or removed using the procedures set forth therein and which is hereby incorporated by reference in its entirety for any and all purposes as set form herein.

The term "amide" (or "amido") includes C- and N-amide groups, i.e., C(O)NR$^2$R$^3$, and —NR$^2$C(O)—R$^3$ groups, respectively. R$^2$ and R$^3$ are independently hydrogen, or a substituted or unsubstituted alkyl, alkenyl, alkynyl, cycloalkyl, aryl, aralkyl, heterocyclylalkyl or heterocyclyl group as defined herein. Amido groups therefore include but are not limited to carbamoyl groups (—C(O)NH$_2$) and formamide groups (—NHC(O)H). In some embodiments, the amide is —NR$^2$C(O)—(C$_{1-5}$ alkyl) and the group is termed "carbonylamino," and in others the amide is —NHC(O)-alkyl and the group is termed "alkanoylamino."

The term "amine" (or "amino") as used herein refers to —NR$^e$R$^f$ groups, wherein R$^e$ and R$^f$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino.

The term "halogen" or "halo" as used herein refers to bromine (Br), chlorine (Cl), fluorine (F), or iodine (I).

The term "polypeptide" or "peptide" as used herein refers to two or more amino acids linked by a peptide (i.e., amide) bond between the carboxyl terminus of one amino acid and the amino terminus of another. The term "peptide" may be combined with a prefix indicating the number of amino acids in the peptide, e.g., a "pentapeptide" is a peptide of five amino acids.

The term "amino acid" is recognized in the art and generally refers to a natural or unnatural alpha or beta amino acid. The term "amino acid" includes, but is not limited to, any one of the standard L-amino acids commonly found in naturally occurring peptides or to unnatural amino acids, the D-isomers of amino acids or racemic amino acids.

The term "amino acid residue with hydrophobic side chain" as used herein refers to the following amino acids: alanine (Ala), valine (Val), isoleucine (Ile), leucine (Leu), methionine (Met), phenylalanine (Phe), tyrosine (Tyr), tryptophan (Trp); or to unnatural amino acids including but not limited to, norleucine, norvaline, cyclohexylalanine, cyclohexylglycine, cyclopentylglycine and the like. In some embodiments, the amino acid residue with hydrophobic side chain is valine (Val). In other embodiments, the amino acid residue may be racemic or chiral (an L-amino acid (S-configuration) or a D-amino acid (R-configuration)), such as L-valine ((S)-valine) or D-valine ((R)-valine)).

The term "amino acid residue derivative" as used herein refers to an amino acid residue that is covalently linked to a functional group or a protecting group. In some embodiments, the amino acid residue is covalently attached to a protecting group. In some embodiments, the amino acid residue is covalently attached to a functional group or a protecting group through the amino or carboxyl group attached to its alpha-carbon or through a functional group present on its side chain (such as the side chain carboxyl of aspartic acid or the side chain amino group of lysine).

The term "acetyl" as used herein refers to a methyl group bonded to a carbonyl group (CH$_3$CO—).

The term "tert-butyloxycarbonyl protecting group" or "tert-butoxycarbonyl protecting group" (Boc group) as used herein refers to a protecting group used in organic synthesis.

The term "piperazine" or "piperazinyl" as used herein refers to an organic isoindole derivative that consists of a six-membered ring containing two nitrogen atoms at opposite positions in the ring.

The term "pyridine" group as used herein refers to a group with the heterocyclic organic moiety with the chemical formula C$_5$H$_5$N.

Pharmaceutically acceptable salts of compounds described herein are within the scope of the present technology and include acid or base addition salts which retain the desired pharmacological activity and are not biologically undesirable (e.g., the salt is not unduly toxic, allergenic, or irritating, and is bioavailable). When the compound of the present technology has a basic group, such as for example, an amino group, pharmaceutically acceptable salts can be formed with inorganic acids (such as hydrochloric acid, hydroboric acid, nitric acid, sulfuric acid, and phosphoric acid), organic acids (e.g., alginic acid, formic acid, acetic acid, benzoic acid, gluconic acid, fumaric acid, oxalic acid, tartaric acid, lactic acid, maleic acid, citric acid, succinic acid, malic acid, methanesulfonic acid, benzenesulfonic acid, naphthalene sulfonic acid, and p-toluenesulfonic acid) or acidic amino acids (such as aspartic acid and glutamic acid). When the compound of the present technology has an acidic group, such as for example, a carboxylic acid group, it can form salts with metals, such as alkali and earth alkali metals (e.g., Na$^+$, Li$^+$, K$^+$, Ca$^{2+}$, Mg$^{2+}$, or Zn$^{2+}$), ammonia or organic amines (e.g., dicyclohexylamine, trimethylamine, triethylamine, pyridine, picoline, ethanolamine, diethanolamine, or triethanolamine) or basic amino acids (e.g. arginine, lysine, or ornithine). Such salts can be prepared in situ during isolation and purification of the isoindole derivatives or by separately reacting the purified isoindole derivative in its free base or free acid form with a suitable acid or base, respectively, and isolating the salt thus formed.

Stereoisomers of compounds (also known as optical isomers) include all chiral, diastereomeric, and racemic forms of a structure, unless the specific stereochemistry is expressly indicated. Thus, compounds used in the present technology include enriched or resolved optical isomers at any or all asymmetric atoms as are apparent from the depictions. Both racemic and diastereomeric mixtures, as well as the individual optical isomers can be isolated or synthesized to be substantially free of their enantiomeric or diastereomeric partners, and these stereoisomers are all within the scope of the present technology.

The term "pharmaceutically acceptable excipient" refers to those substances that are well accepted by the pharmaceutical industry and regulatory agencies. These substances may be listed in monographs published in compendia such as USP-NF, Food Chemicals Codex, Code of Federal Regulations (CFR), FDA Inactive Ingredients Database and in 21 CFR parts 182 and 184 that lists substances that are generally regarded as safe (GRAS) food ingredients.

In various embodiments, the compound represented by Formula I is one or more of the following isoindole derivatives, with the understanding that where chiral centers are present for each representation, these embodiments include any R, S, or racemic structures as well, represented by derivatives I-1 through I-23:

(I-1)

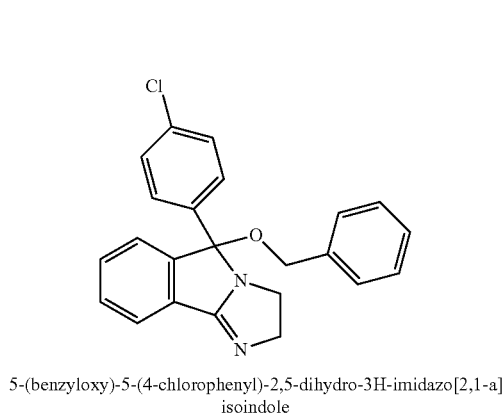

5-(benzyloxy)-5-(4-chlorophenyl)-2,5-dihydro-3H-imidazo[2,1-a]isoindole (I-2)

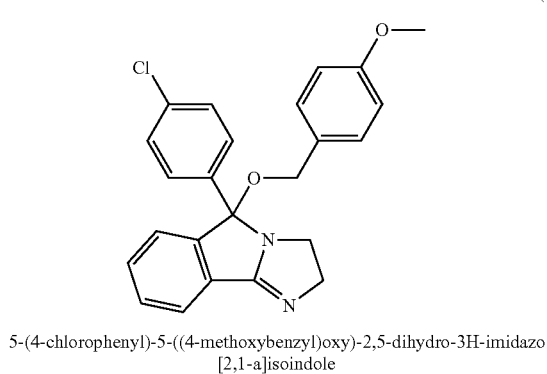

5-(4-chlorophenyl)-5-((4-methoxybenzyl)oxy)-2,5-dihydro-3H-imidazo[2,1-a]isoindole (I-3)

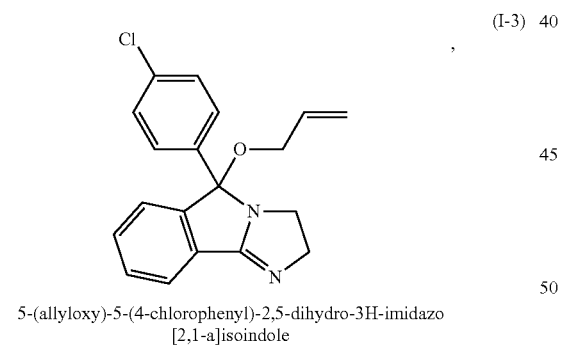

5-(allyloxy)-5-(4-chlorophenyl)-2,5-dihydro-3H-imidazo[2,1-a]isoindole (I-4)

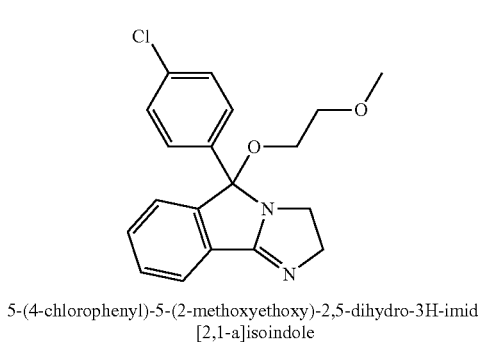

5-(4-chlorophenyl)-5-(2-methoxyethoxy)-2,5-dihydro-3H-imidazo[2,1-a]isoindole (I-5)

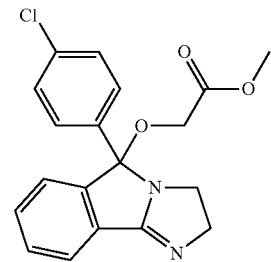

methyl 2-((5-(4-chlororphenyl)-2,5-dihydro-3H-imidazo[2,1-a]isoindol-5-yl)oxy)acetate (I-6)

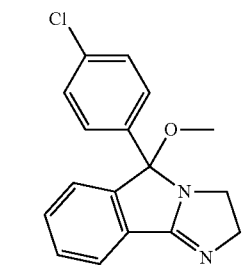

5-(4-chlorophenyl)-5-methoxy-2,5-dihydro-3H-imidazo[2,1-a]isoindole (I-7)

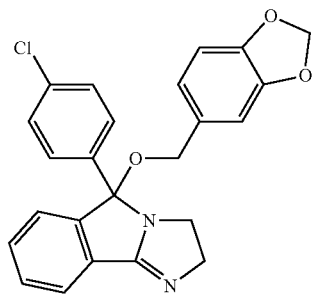

5-(benzo[d][1,3]dioxol-5-ylmethoxy)-5-(4-chlorophenyl)-2,5-dihydro-3H-imidazo[2,1-a]isoindole (I-8)

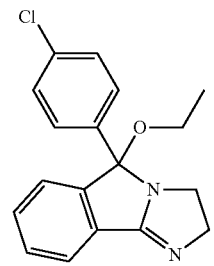

5-(4-chlorophenyl)-5-ethoxy-2,5-dihydro-3H-imidazo[2,1a]isoindole

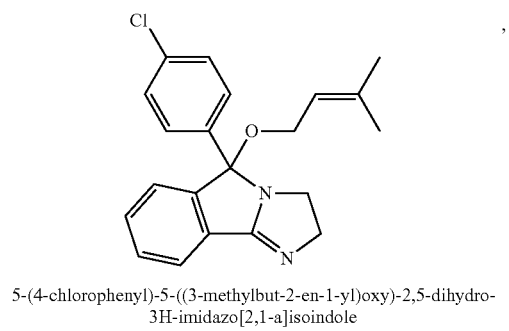

5-(4-chlorophenyl)-5-((3-methylbut-2-en-1-yl)oxy)-2,5-dihydro-
3H-imidazo[2,1-a]isoindole (I-9)

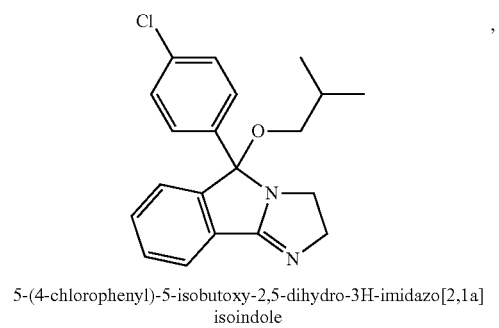

5-(4-chlorophenyl)-5-isobutoxy-2,5-dihydro-3H-imidazo[2,1a]
isoindole (I-10)

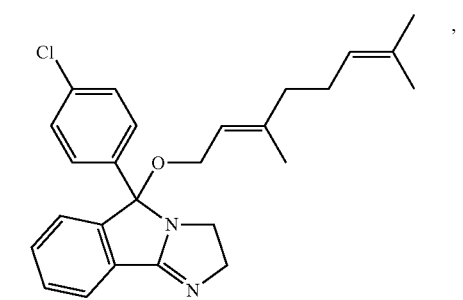

(E)-5-(4-chlorophenyl)-5-((3,7-dimethylocta-2,6-dien-1-yl)
oxy)-2,5-dihydro-3H-imidazo[2,1-a]isoindole (I-11)

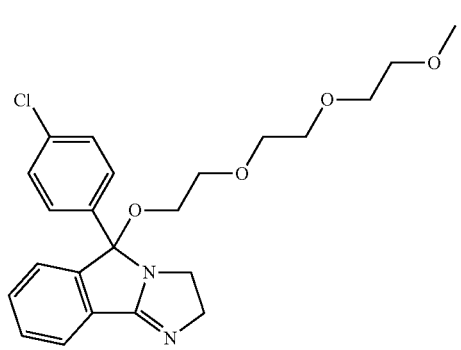

5-(4-chlorophenyl)-5-(2-(2-(2-methoxyethoxy)ethoxy)ethoxy)-2,5-
dihydro-3H-imidazo[2,1a]isoindole (I-12)

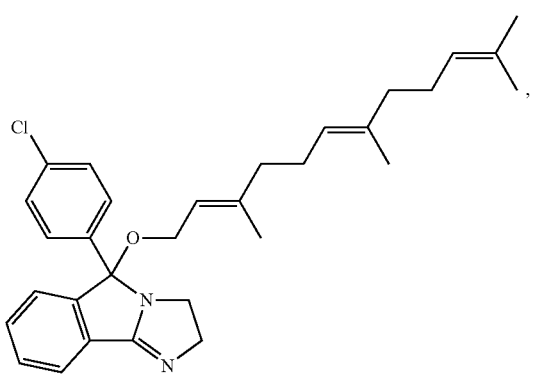

5-(4-chlorophenyl)-5-(((2E,6E)-3,7,11-trimethyldodeca-2,6,10-trien-
1-yl)oxy)-2,5-dihydro-3H-imidazo[2,1-a]isoindole (I-13)

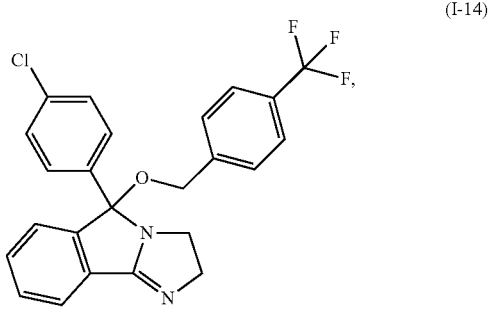

5-(4-chlorophenyl)-5-((4-(trifluoromethyl)benzyl)oxy)-
2,5-dihydro-3H-imidazo[2,1-a]isoindole (I-14)

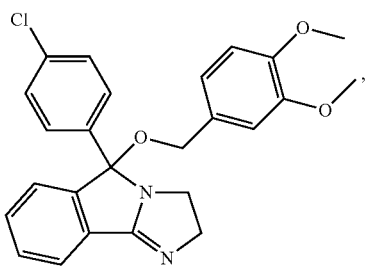

5-(4-chlorophenyl)-5-((3,4-(dimethoxybenzyl)oxy)-
2,5-dihydro-
3H-imidazo[2,1-a]isoindole (I-15)

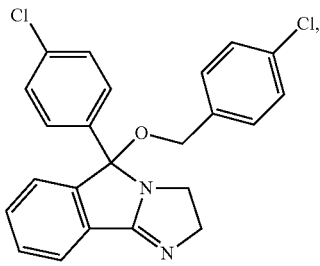

5-((4-chlorophenyl)oxy)-5-(4-chlorophenyl)-
2,5-dihydro-3H-imidazo[2,1-a]
isoindole (I-16)

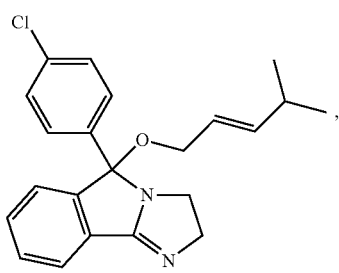

(E)-5-(4-chlorophenyl)-5-((4-methylpent-2-en-1-yl)
oxy)-2,5-dihydro-3H-imidazo[2,1-a]isoindole
(I-17)

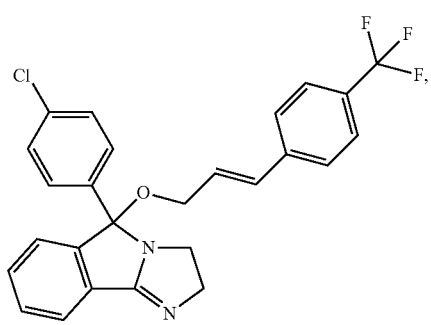

(E)-5-(4-chlorophenyl)-5-((3-(4-(trifluoromethyl)phenyl)
allyl)oxy)-2,5-dihydro-3H-imidazo[2,1-a]isoindole
(I-18)

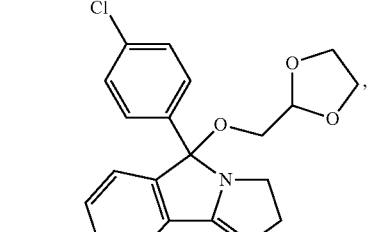

5-((1,3-dioxolan-2-yl)methoxy)-5-(4-chlorophenyl)-
2,5-dihydro-3H-imidazo[2,1-a]isoindole
(I-19)

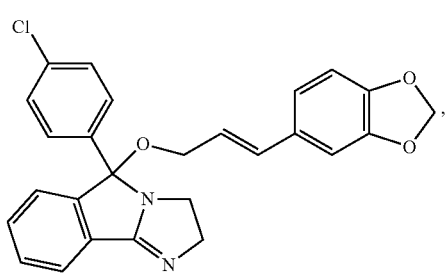

(E)-5-((3-benzo[d][1,3]dioxol-5-yl)allyl)oxy)-5-
(4-chlorophenyl)-2,5-dihydro-3H-imidazo
[2,1-a]isoindole
(I-20)

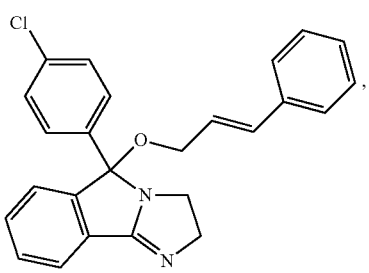

5-(4-chlorophenyl)-5-(cinnamyloxy)-2,5-dihydro-
3H-imidazo[2,1-a]isoindole
(I-21)

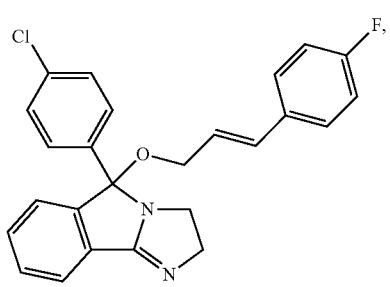

(E)-5(4-chlorophenyl)-5-((3-(4-fluorophenyl)allyl)
oxy)-2,5-dihydro-3H-imidazo[2,1-a]
isoindole
(I-22)

or

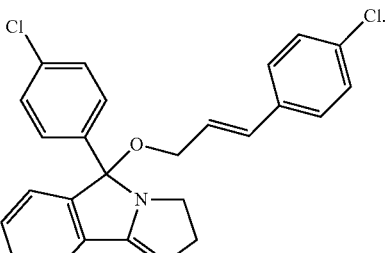

(E)-5(4-chlorophenyl)-5-((3-(4-chlorophenyl)ally)
oxy)-2,5-dihydro-3H-imidazo[2,1-a]
isoindole
(I-23)

In various embodiments, the compound represented by Formula II is one or more of the following isoindole derivatives, with the understanding that where chiral centers are present for each representation, these embodiments include any R, S, or racemic structures as well, represented by derivatives II-1 through II-9:

(II-1)

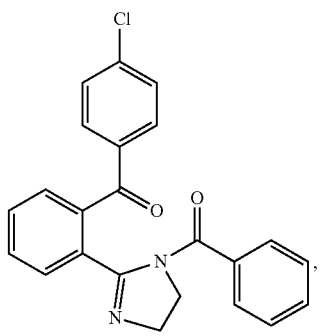

(2-(1-benzoyl-4,5-dihydro-1H-imidazol-
2-yl)phenyl)(4-chlorophenyl)methanone (II-2)

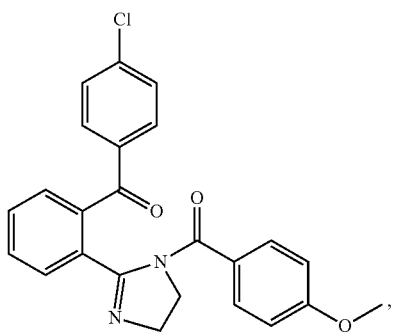

(2-(2-(4-chlorobenzoyl)phenyl)-
4,5-dihydro-1H-imidazol-yl)
(4-methoxyphenyl)methanone (II-3)

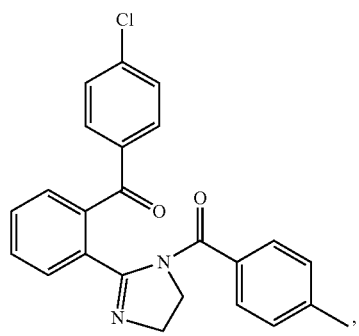

(2-(2-(4-chlorobenzoyl)phenyl)-4,5-dihydro-
1H-imidazol-1-yl)(p-tolyl)methanone (II-4)

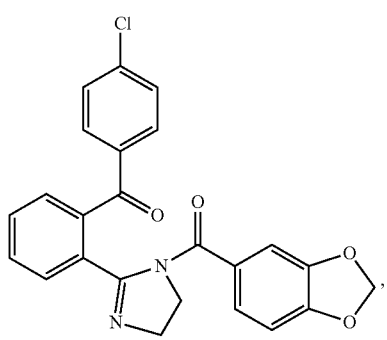

benzo[d][1,3]dioxol-5-yl
(2-(2-(4-chlorobenzoyl)phenyl)-
4,5-dihydro-1H-imidazol-1-yl)methanone (II-5)

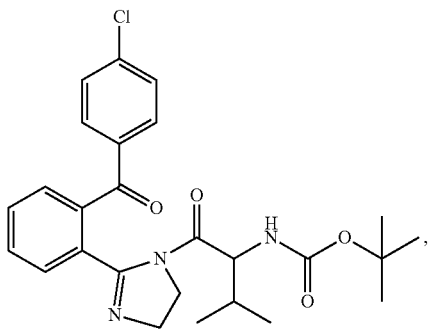

tert-butyl (1-(2-(2-(4-chlorobenzoyl)phenyl)-
4,5-dihydro-1H-imidazol-1-yl)-
3-methyl-1-oxobutan-2-yl)carbamate (II-6)

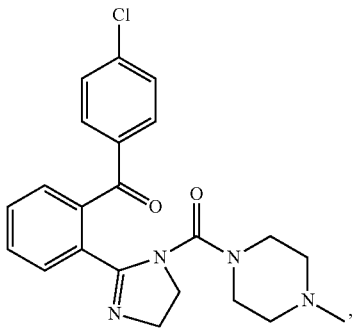

(2-(2-(4-chlorobenzoyl)phenyl)-
4,5-dihydro-1H-imidazol-1-yl)
(4-methylpiperazin-1-yl)methanone (II-7)

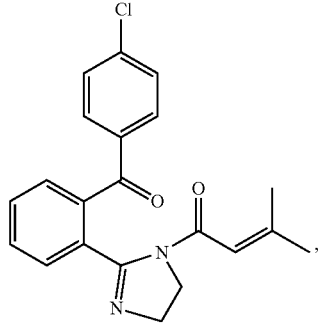

1-(2-(2-(4-chlorobenzoyl)phenyl)-
4,5-dihydro-1H-imidazol-1-yl)-
3-methylbut-2-en-1-one (II-8)

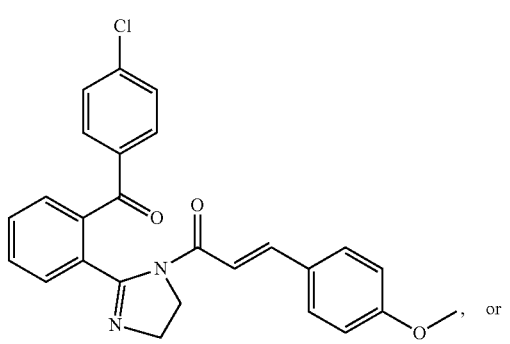

(E)-1-(2-(2-(4-chlorobenzoyl)phenyl)-
4,5-dihydro-1H-imidazol-1-yl)-3-
(4-methoxyphenyl)prop-2-en-1-one , or (II-9)

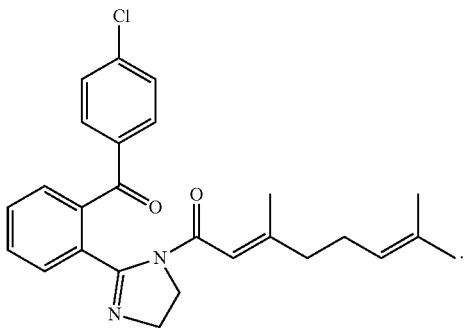

(E)-1-(2-(2-(4-chlorobenzoyl)phenyl)-4,5-dihydro-1H-imidazol-1-yl)-3,7-dimethylocta-2,6-dien-1-one In one embodiment, the compound represented by Formula III is the following isoindoline derivative, with the understanding that where chiral centers are present for each representation, these embodiments include any R, S, or racemic structures as well:

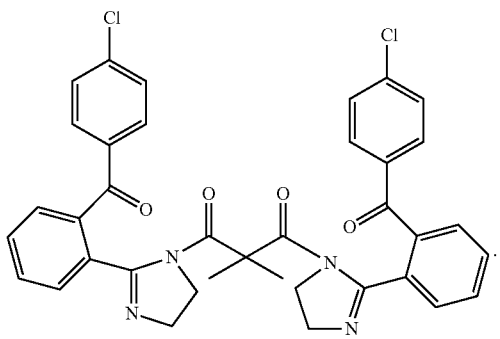

1,3-bis(2-(2-(4-chlorobenzoyl)phenyl)-4,5-dihydro-1H-imidazol-1-yl)-2,2-dimethylpropane-1,3-dione (III-1)

In some embodiments, a composition includes a compound derivative of Formula I, II, or III, a stereoisomer thereof, or a pharmaceutically acceptable salt thereof, and at least one pharmaceutically acceptable excipient or carrier.

In some embodiments, a pharmaceutical composition comprises a compound of Formula I, II, or III, a stereoisomer thereof, or a pharmaceutically acceptable salt thereof, with a pharmaceutically acceptable carrier or excipient. The pharmaceutical composition may be in an appropriate dosage form. Illustrative dosage forms include, but are not limited to, injections, tablets, capsules, sprinkles, solutions, suspensions, suppositories, caches, pouches, oral, nasal, rectal, transdermal, implants, and the like.

In another aspect, the treatment of diseases or disorders including the treatment of CNS disorders is provided by administering a composition including a compound of Formula I, II, or III, a stereoisomer thereof, or a pharmaceutically acceptable salt thereof, as described herein to a subject in need thereof.

In one aspect, the subject is a mammal. In further embodiments, the mammalian subject is a human. In particular embodiments, the human subject is an adult or a child or an adolescent.

In some embodiments, the methods described herein include administering the compound of Formula I, II, or III, a stereoisomer thereof, or a pharmaceutically acceptable salt thereof, along with at least one additional active pharmaceutical agent. In some embodiments, the additional active pharmaceutical agent is another agent for the treatment CNS disorders. In further embodiments, the additional pharmaceutical agent is an isoindoline derivative.

In another aspect, a therapeutically effective amount of the compound of Formula I, II, or III, a stereoisomer thereof, or a pharmaceutically acceptable salt thereof, or a composition comprising a therapeutically effective amount of the compound of Formula I, II, or III, a stereoisomer thereof, or a pharmaceutically acceptable salt thereof, as described herein, is for use in the treatment of diseases or disorders including the treatment of CNS.

EXAMPLES

Provided herein are novel compositions and methods of manufacture of isoindole derivatives, analogs, prodrugs, and pharmaceutically acceptable salts thereof suitable for pharmaceutical applications. The isoindole derivatives described herein may themselves be pharmacologically active for the treatment of CNS diseases and may also act as prodrugs producing active metabolites in the body when administered to a human child, adolescent, or adult.

Shown below are examples of the transformation of the prodrugs described herein into the parent drug:

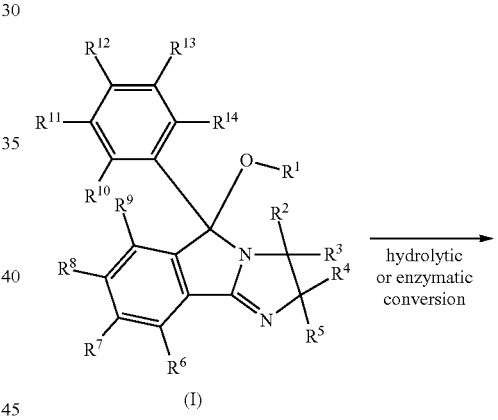

(I)

hydrolytic or enzymatic conversion

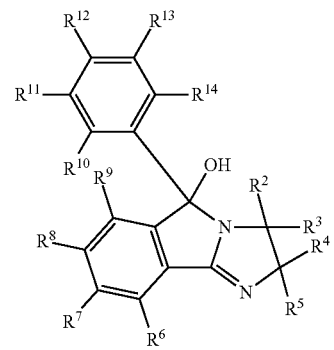

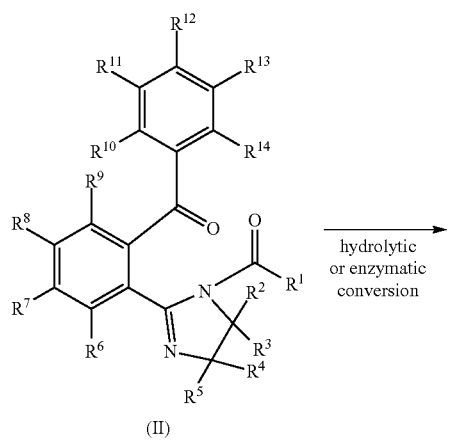
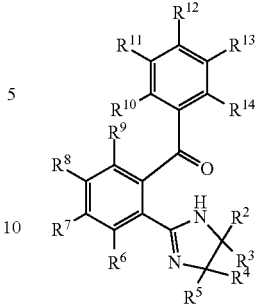
Example 1: Synthesis of I-2 and O-Substituted Analogs
The compounds described herein were prepared by treating compound A or a derivative thereof with a base, then an alkylating agent or an acylating agent:
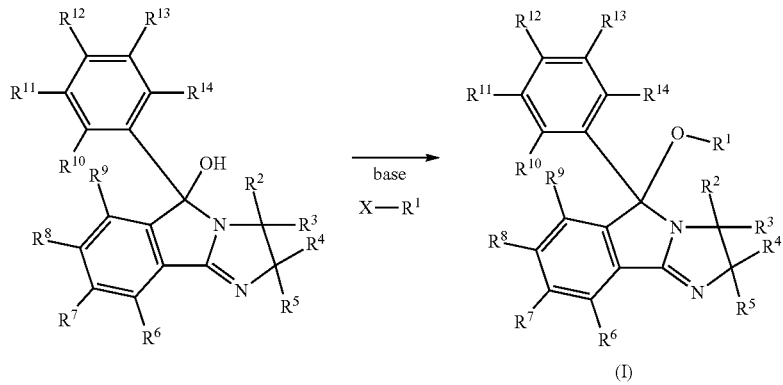
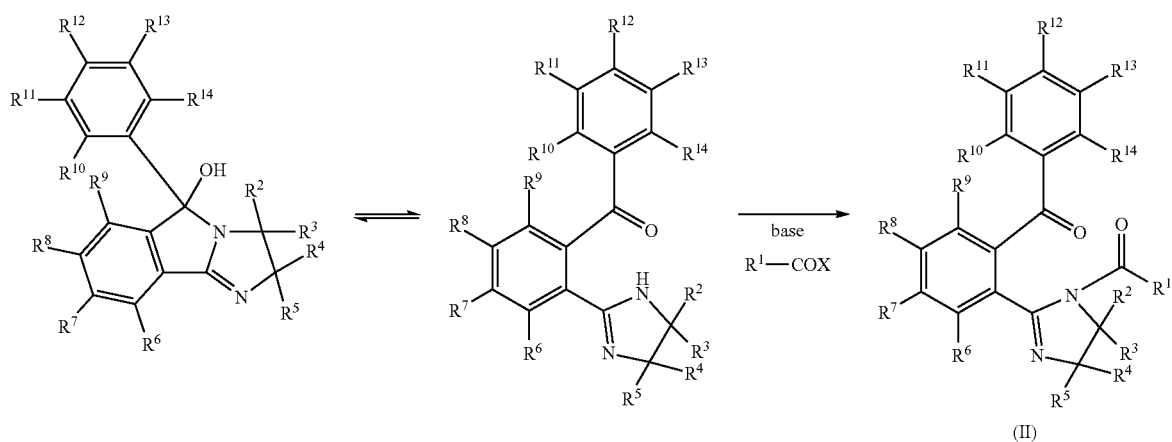

The base used to prepare the prodrug may be, but is not limited to, KOH in DMSO or NaH in DMF.

Preparation of I-2

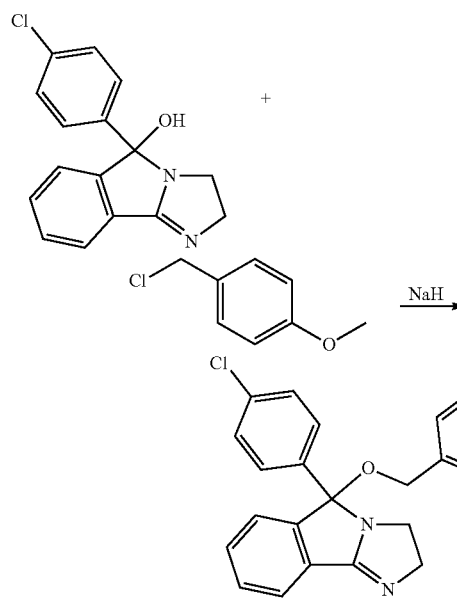

Compound A, 5-(4-chlorophenyl)-2,3-dihydroimidazo[1,2-b]isoindol-5-ol, (160 mg, 0.56 mmol) was suspended in 2 mL of dimethylformamide (DMF). Sodium hydride (NaH) (60%, 100 mg, 2.5 mmol) was added to the mixture and was stirred at room temperature for 10 min. After 4-methoxybenzyl chloride (0.15 mL, 1.12 mmol) was added to the mixture, the mixture was stirred at room temperature for 1 hr. The mixture was quenched with water and was extracted with ethyl acetate (EtOAc) (4×20 mL). The combined organic phase was washed with saturated NaCl (5×20 mL) and was dried with magnesium sulfate ($MgSO_4$). The concentrated crude product was purified by HPLC by eluting with 40%-100% $CH_3CN$ in $H_2O$ to give 155 mg of product. The yield for the preparation of I-2 was 68% (PK data provided in Table 6 below).

Preparation of derivatives I-1, I-3, I-4, I-6, I-7, I-8, I-9, I-10, I-11, I-12, I-14

Derivatives I-1, I-3, I-4, I-6, I-7, I-8, I-9, I-10, I-11, I-12, and I-14 with the corresponding halide were prepared using the same method that was used to prepare I-2. Table 1 shows the amount of each compound that was obtained.

TABLE 1

Amount of Formula I derivatives obtained

| Compound | Halide | Amount obtained |
|---|---|---|
| I-1 | benzyl bromide | 39 mg |
| I-3 | allyl bromide | 150 mg |
| I-4 | 2-bromoethyl methyl ether | 150 mg |
| I-6 | methyl iodide | 87 mg |
| I-7 | 3,4-methylenedioxybenzyl chloride | 160 mg |
| I-8 | ethyl bromide | 170 mg |
| I-9 | prenyl bromide | 160 mg |
| I-10 | isobutyl bromide | 37 mg |
| I-11 | geranyl bromide | 220 mg |

TABLE 1-continued

Amount of Formula I derivatives obtained

| Compound | Halide | Amount obtained |
|---|---|---|
| I-12 | diethylene glycol 2-bromoethyl methyl ether | 288 mg |
| I-14 | farnesyl bromide | 150 mg |

(PK data for I-1, I-9 in Table 6; PK data for I-14 in Table 7; PK data for I-3, 1-4, I-6, I-7 in Table 8; PK data for I-10 in Table 9; PK data for I-8, I-11, I-12 in Table 10)

Example 2: Preparation of I-4

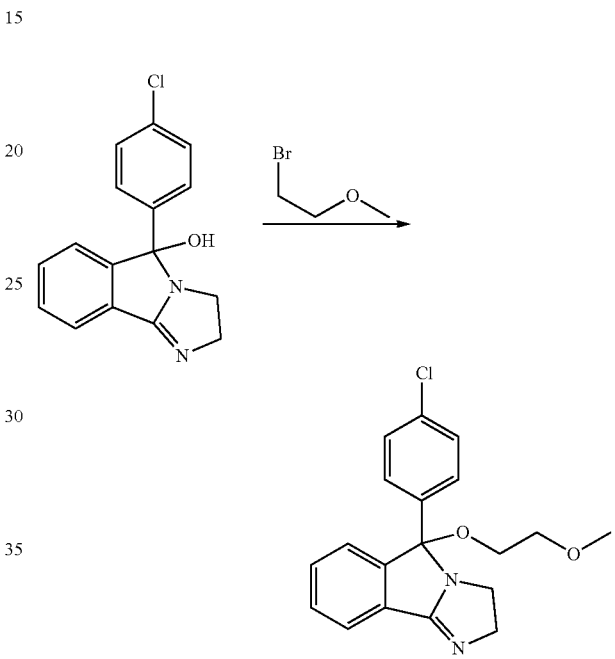

NaH (3 g, 60% dispersion in mineral oil; 75 mmol) was placed in a round-bottom flask, flushed with atmospheric nitrogen ($N_2$) and washed with hexane (3×). To the flask, 30 mL of DMF was added. The mixture was stirred, and Compound A (8.56 g, 30 mmol) was added in portions over circa ("ca.") 10 min. Then, the mixture was stirred for 20 min at room temperature. 2-Bromoethylmethyl ether (Oakwood; 6.26 g, 45 mmol) was added and the mixture stirred at room temperature for 1 hr (TLC showed ca. 40% reaction). The mixture was then heated at 50° C. for 1 hr (TLC showed some additional conversion of starting material to product).

An additional 1.4 mL (15 mmol) of the 2-bromoethylmethyl ether was added and the mixture was heated at 50° C. for 1 hr. The mixture was then cooled to room temperature and excess NaH was quenched by the addition of water. The mixture was extracted with EtOAc (4×) and the combined extracts washed with brine (5×), dried over $MgSO_4$ and evaporated. The crude product (12.5 g) was flash chromatographed (acetonitrile, then 5% isopropanol in acetonitrile), and the product I-4 (7.15 g) was obtained after evaporating (using lyophilization method) from acetonitrile/water. The product was a white solid (HPLC: 97.4%; MS: M+H 343; $^1H$ and $^{13}C$ NMR represented in FIG. 1; PK data is shown in Table 8 below).

Example 3: Preparation of I-5

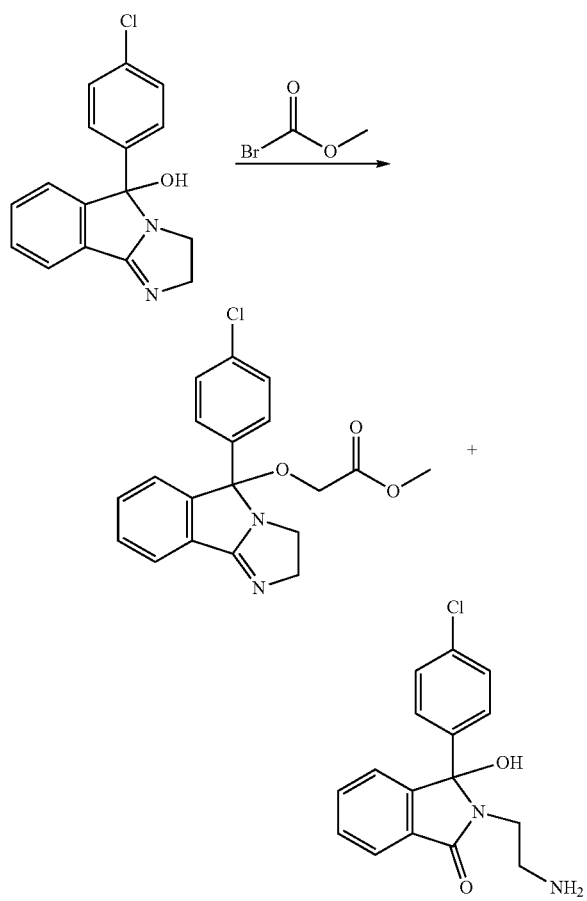

Compound A (0.18 g, 0.65 mmol) was suspended in 2 mL of DMF and 100 mg NaH (2.5 mmol; 60% dispersion in mineral oil) was added to the mixture. After the hydrogen evolved during the addition subsided, the mixture was allowed to stir at room temperature for over 10 min. To the mixture was added (124 µL, 1.3 mmol) of methyl bromoacetate in 1 mL of DMF. After stirring for 1 hour, thin-layer chromatography (TLC) showed mostly unreacted starting material, Compound A (100 mg, 2.5 mmol). Additional NaH was added to the mixture, and it was allowed to stir for 5 min followed by a second portion of methyl bromoacetate (124 µL, 1.3 mmol). After the mixture was stirred for 1 hr (no unreacted starting material left), it was diluted with water and was extracted with EtOAc (4×). The combined extract was washed with brine (4×), was dried over MgSO$_4$, and was evaporated.

Preparatory HPLC of the crude product gave a mixture of the desired compound in addition to some Compound A (formed during the HPLC separation). After the product was treated with dichloromethane, the solution was dried over MgSO$_4$, and was evaporated to give 15 mg of the ether derivative I-5 as an oily solid (97.7% by HPLC). After the sample was stored for 2 days at room temperature (RT) in acetonitrile solution, it had decomposed to approximately 85% purity with the main byproduct being a ring-opened form of Compound A.

A sample of the 15 mg isolated material was evaluated for stability in water and in a pH 7.4 buffer. After 24 hours, the sample in water had 86% remaining and the sample in the pH 7.4 buffer had 92% remaining. The decomposition gave mainly the ring-opened Compound A as a byproduct.

Example 4: Preparation of I-7

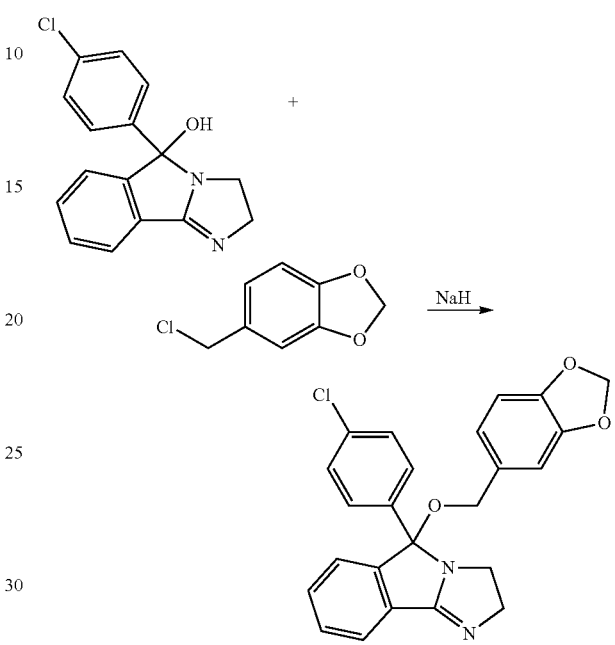

NaH (11.3 g, 283 mmol; 60% in oil) was washed under a nitrogen atmosphere with dry hexane (3×10 mL), and 150 mL of DMF was added. Compound A (30.19 g, 106 mmol) was added to the suspension in three portions over 30 min. The mixture was stirred for an additional 40 min at room temperature. 3,4-methylenedioxybenzyl chloride (27 g, 158 mmol; obtained by evaporating from a 50% solution in dichloromethane as supplied by Aldrich) was added to the mixture, and the mixture was stirred for 2 hr at room temperature. Water (100 mL; dropwise at first to quench excess NaH) was added to the mixture and 100 mL of EtOAc was also added to the mixture. The mixture was filtered to remove some particulates and was extracted with EtOAc (4×100 mL). The combined extracts were washed with brine (6×100 mL) and dried over MgSO$_4$ and were evaporated on a rotary evaporator.

The crude product (ca. 60 g) was divided into 12 g portions, and each was flash chromatographed on silica gel (50 g) first by eluting with acetonitrile and followed with an elution of 5% isopropanol in acetonitrile. The combined fractions containing the desired product were dissolved in 30 mL of acetonitrile, and 30 mL of water was added to the mixture. The solution was lyophilized to obtain the product I-7 as a solid. From five flash column runs, a total of 24.5 g of I-7 product was obtained. Impure fractions were combined and re-chromatographed to obtain an additional 6.94 g of product. A small amount of Compound A (<1%) was seen in the HPLC of the chromatographed product fractions (but was absent in the crude, suggesting hydrolysis catalyzed by silica gel).

The procedure was repeated starting from 38.22 g of Compound A (1.27× the scale of the first run) to obtain an additional 39.43 g of product as a white solid. Fractions with HPLC purity between 95.4% and 96.9% were omitted from the final material, giving a total of 60 g of I-7 for testing (HPLC 97.4%; MS m/e M+H 419; PK data is shown in Table 8 below).

Example 5: Preparation of I-9

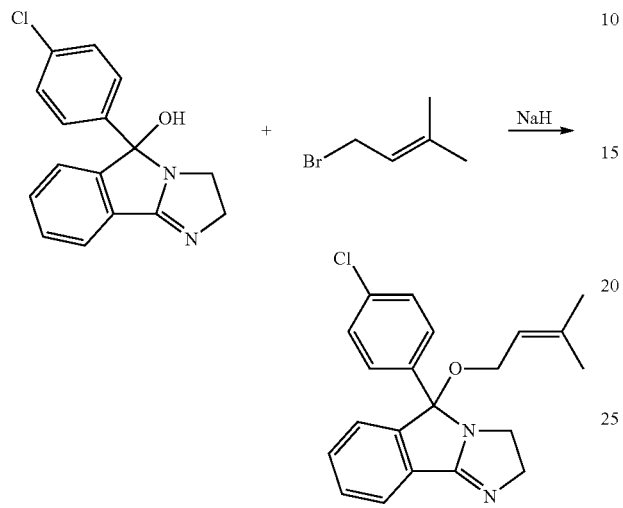

NaH (12 g, 300 mmol; 60% in oil) was placed in a 500 mL flask under nitrogen and was washed with dry hexane (2×60 mL). After 200 mL of DMF was added to the flask, Compound A (29.26 g; 103.02 mmol) was added in portions over 30 min at room temperature. After 45 min of stirring at room temperature, 3,3-dimethylallyl bromide (25.7 g, 172 mmol) was slowly added to the solution over 30 min at room temperature and stirring of the solution was continued for 4 hr. The solution was cooled in an ice bath and was quenched by the addition of brine (dropwise until hydrogen evolution stopped, then 100 mL). The mixture was extracted with 500 mL of EtOAc and was washed with water (3×400 mL) and brine (300 mL). The mixture was dried over sodium sulfate and was evaporated to give 42 g of crude product as an oil with suspended solid. The crude product was washed with cold 10% diethyl ether in hexane (3×100 mL), and the residual solid was dried in vacuo to give 16 g of white solid. The mother liquors from the ether-hexane wash were combined and were evaporated, and the oil was kept in the freezer overnight. Crystals were separated and rinsed with 10% diethyl ether in hexane (3×25 mL) and the solid dried in vacuo. A total of 18 g of I-9 was obtained from the two crops.

The above procedure was repeated twice using 29.97 g and 32.28 g of Compound A as the starting material and the product solid was isolated as previously described to give 18 g and 20 g of I-9. All mother liquors and materials from the exploratory run (1.76 g) were evaporated and were crystallized as previously described to give an additional 4.2 g of product.

The combined product (62 g) was dissolved in 800 mL of dry ether, treated with 2 g of activated charcoal Norit® (activated carbon), and warmed to reflux for 10 min. Next, it was filtered through Celite® (diatomaceous earth) and evaporated to give 60.8 g of I-9 as an off-white/light pink solid (HPLC 99.2%; MS m/e M+H 353; PK data provided in Table 6 below).

Example 6: Synthesis of I-15 and O-Substituted Analogs

Preparation of I-15

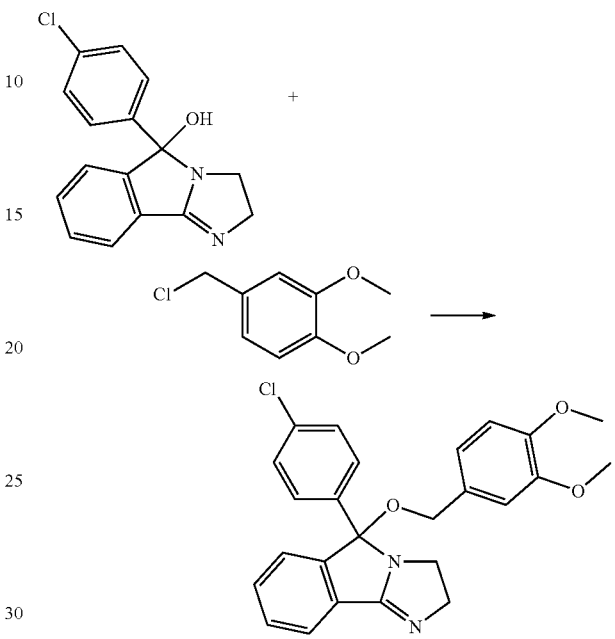

Compound A (560 mg, 2.0 mmol) was suspended in 10 mL of DMF. NaH (60%, 240 mg, 6 mmol) was added to the suspension and the mixture was stirred at room temperature for 30 min. Following the addition of 3,4-dimethoxybenzyl chloride (558 mg, 3.0 mmol), the mixture was stirred at room temperature for 2 hr. It was quenched with water and was then extracted with EtOAc (3×30 mL). The combined organic phase was washed with saturated NaCl (5×30 mL) and was dried with MgSO$_4$. The concentrated crude product I-15 was purified by flash chromatography by eluting with CH$_3$CN to CH$_3$CN:isopropanol 2:1 to give 716 mg of product (HPLC 97.5% pure; MS M+H 435; PK data is shown in Table 7 below).

Derivatives I-14, I-16, I-17, I-18, and I-19 with the corresponding halide were prepared using the same method used to prepare I-15. The amount of derivative obtained is listed in Table 2 below.

TABLE 2

Amounts obtained for derivatives I-14, I-16, I-17, I-18, and I-19.

| Compound | Halide | Amount obtained |
|---|---|---|
| I-14 | 4-trifluoromethylbenzyl chloride | 700 mg |
| I-16 | 4-chlorobenzyl chloride | 610 mg |
| I-17 | 1-bromo-4-methyl-2-pentene | 180 mg |
| I-18 | 4-trifluoromethyl-1-[(1E)-3-bromo-propen-1yl]-benzene | 400 mg |
| I-19 | 2-chloromethyl-1,3-dioxolane | 200 mg |

Figure 2:
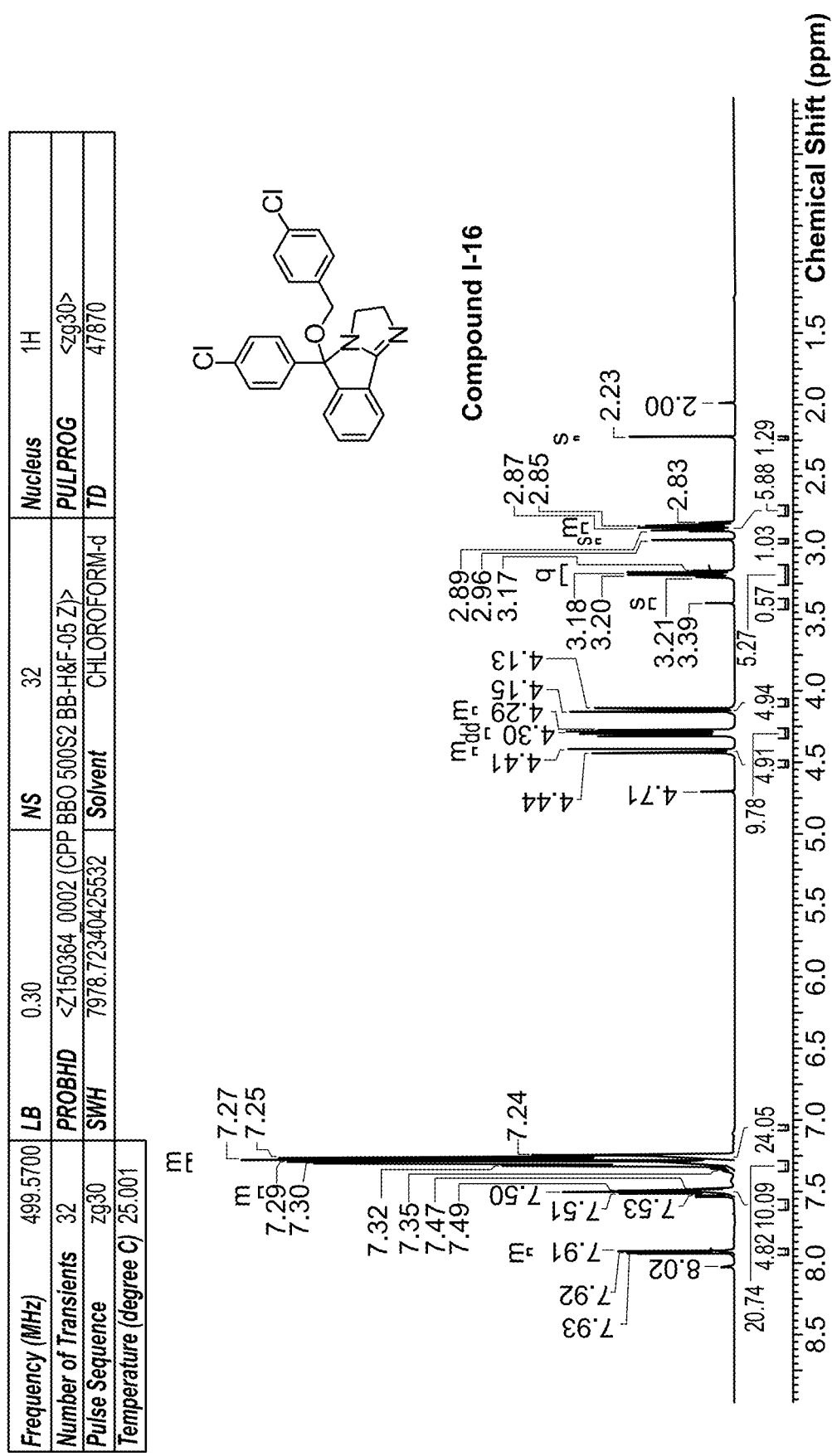
FIG. 2. shows the $^1$H and $^{13}$C NMR spectra of I-16 from Example 6.
Figure 2:
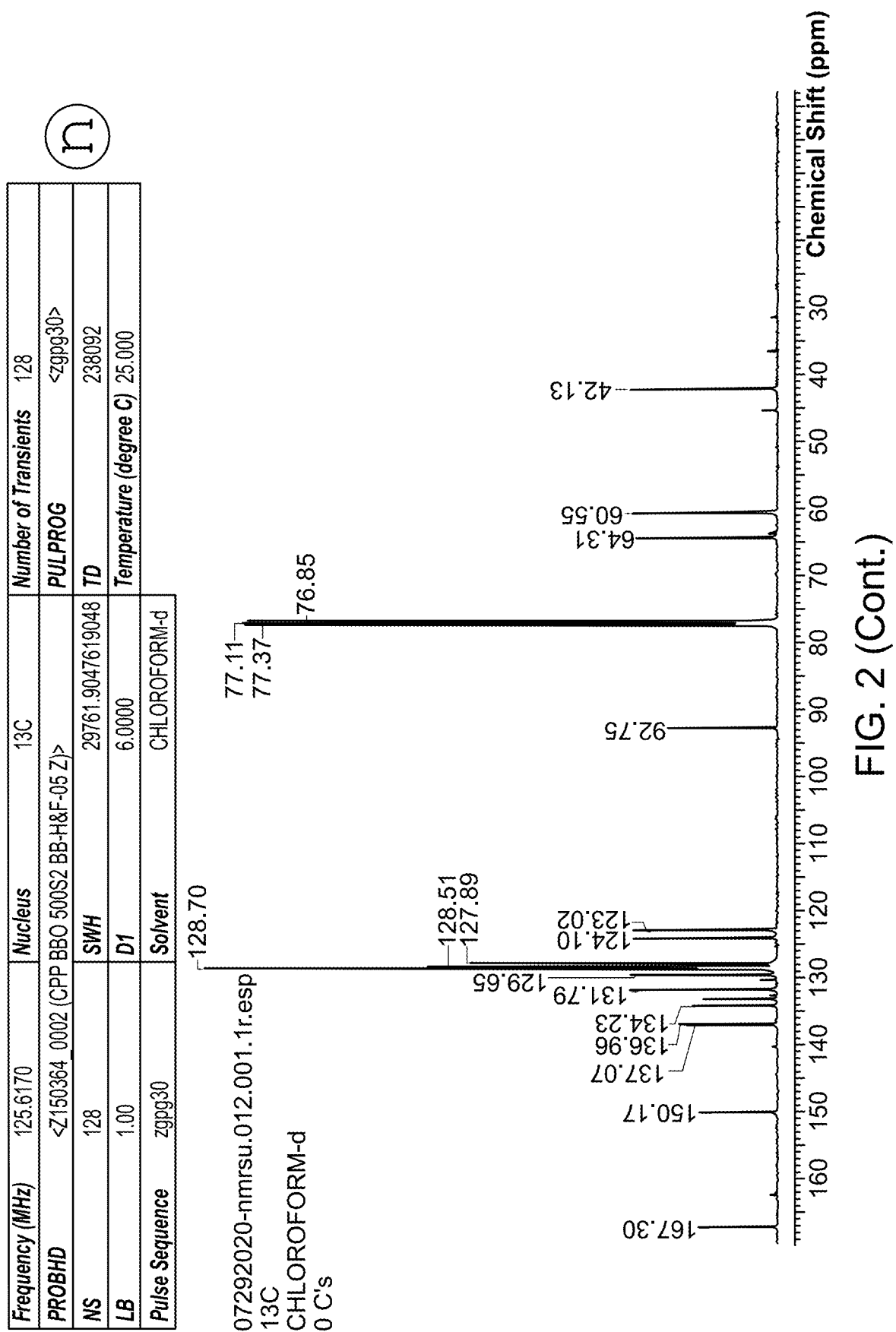

(PK data for I-14, I-16, I-17, I-18, I-19 is shown in Table 7; Product I-16 was obtained (HPLC: 98.6%; MS: M + H 409; $^1$H and $^{13}$C NMR represented in FIG. 2))

Example 7: Preparation of I-17

Preparation of the Halide
1-bromo-4-methyl-2-pentene for the Preparation of
I-17

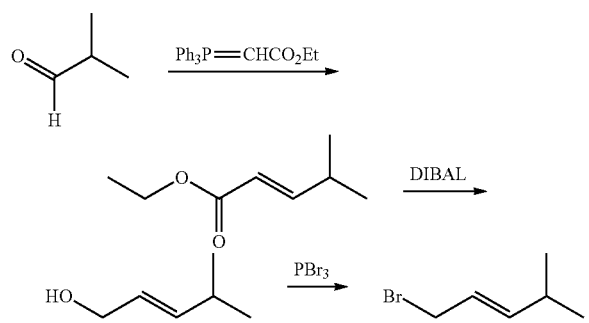

The halide 1-bromo-4-methyl-2-pentene used for the preparation of I-17 was prepared by the method of Perez-Estrada, Sayar, and Granja (Org. Chem. Front., 2016, 3, 1331-1336 (suppl)). 1-bromo-4-methyl-2-pentene was prepared via the Wittig reaction of isobutyraldehyde with ethyl triphenylphosphorylidine acetate to give the unsaturated ester. The reaction was followed with the reduction to the allylic alcohol with diisobutylaluminum hydride (DIBAL) and the conversion to the allylic bromide with phosphorus tribromide (PBr$_3$). The allylic bromide was used without further purification for the preparation of I-17.

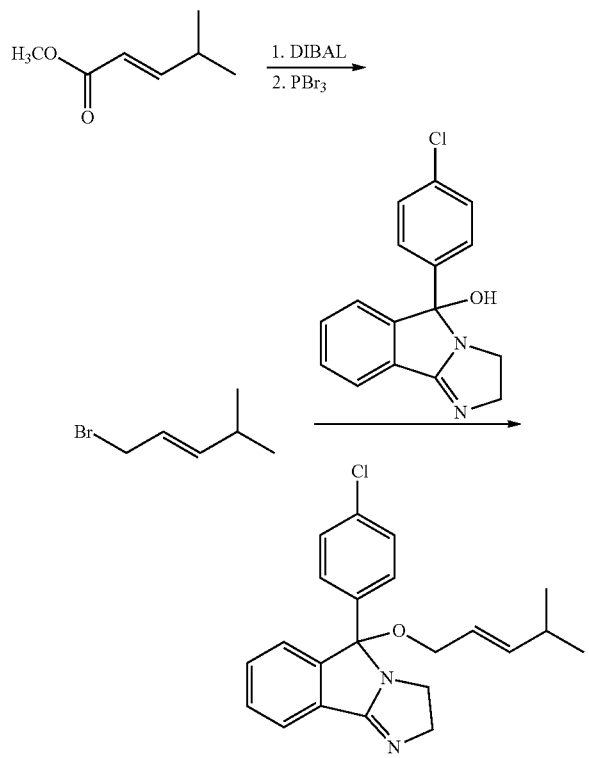

Methyl-4-methyl-2-pentenoate (Oakwood; 5.56 g, 43 mmol) was dissolved in 30 mL dichloromethane and cooled to −78° C. Diisobutylaluminum hydride (Aldrich, 1.0 M in dichlormethane; 108 mL, 108 mmol) was added dropwise at −78° C. and stirred for 2 hr. Water (20 mL) was added followed by 80 mL of 2N NaOH and the mixture was allowed to warm to room temperature then filtered through Celite® (diatomaceous earth). The layers were separated and the aqueous extracted with dichloromethane (3×). The combined extract was washed with brine (3×), dried with MgSO$_4$ and evaporated to give 4.2 g of the intermediate alcohol that was used without further purification.

The alcohol (43 mmol) was dissolved in 30 mL of ether and cooled to 0° C. and 2.84 mL of PBr$_3$ (30 mmol) in 5 mL of ether was added and the solution stirred for 2 hr. To the solution saturated sodium bicarbonate was added (until no further CO$_2$ bubbled) and the mixture was extracted with ether (3×). The combined extracts were washed with brine (2×), dried with MgSO$_4$, and evaporated to give the allylic bromide as a colorless oil (4.67 g).

Figure 3:
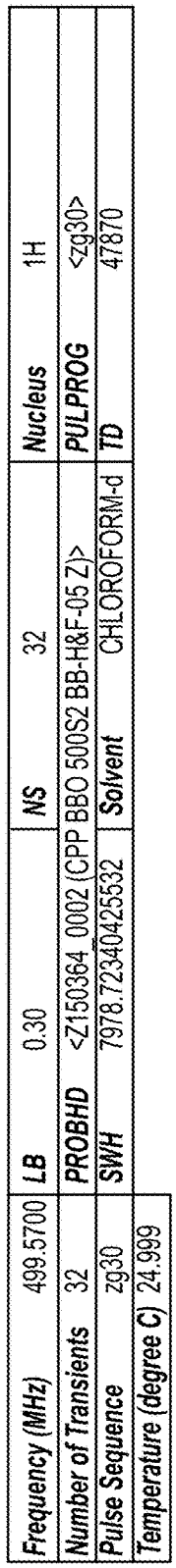
FIG. 3. shows the $^1$H and $^{13}$C NMR spectra of I-17 from Example 7.
Figure 3:
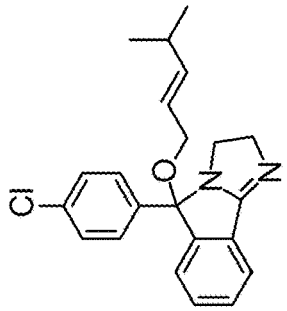
Figure 3:
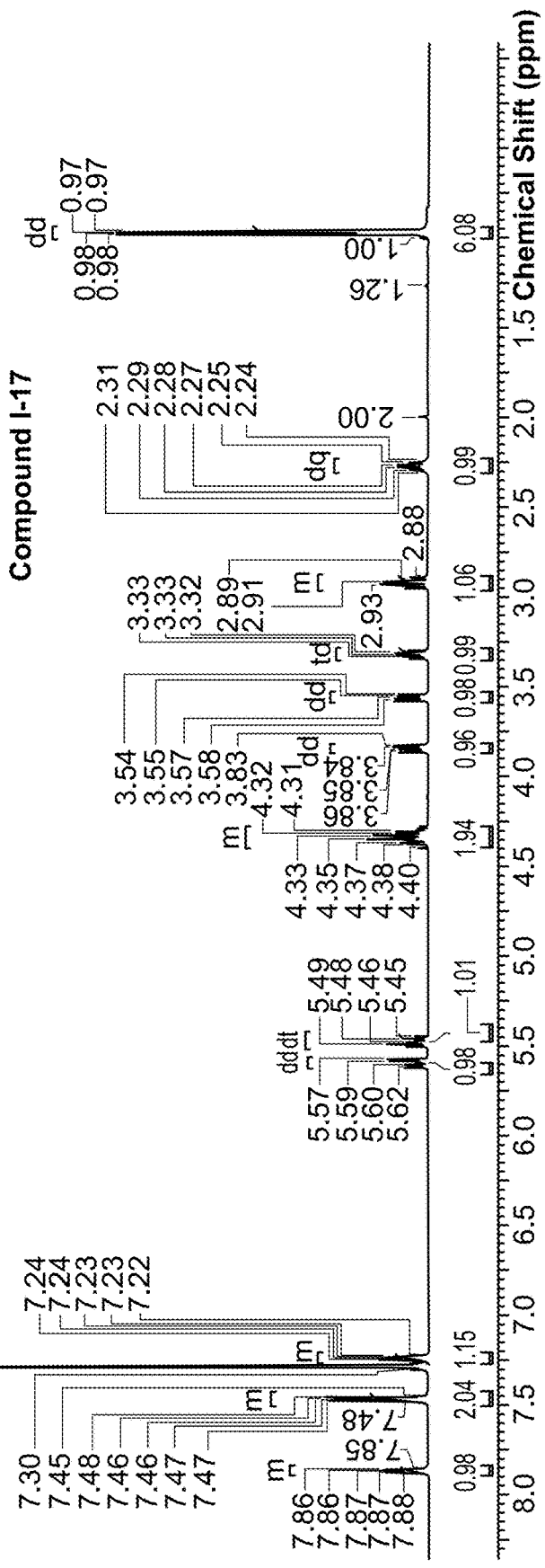
Figure 3:
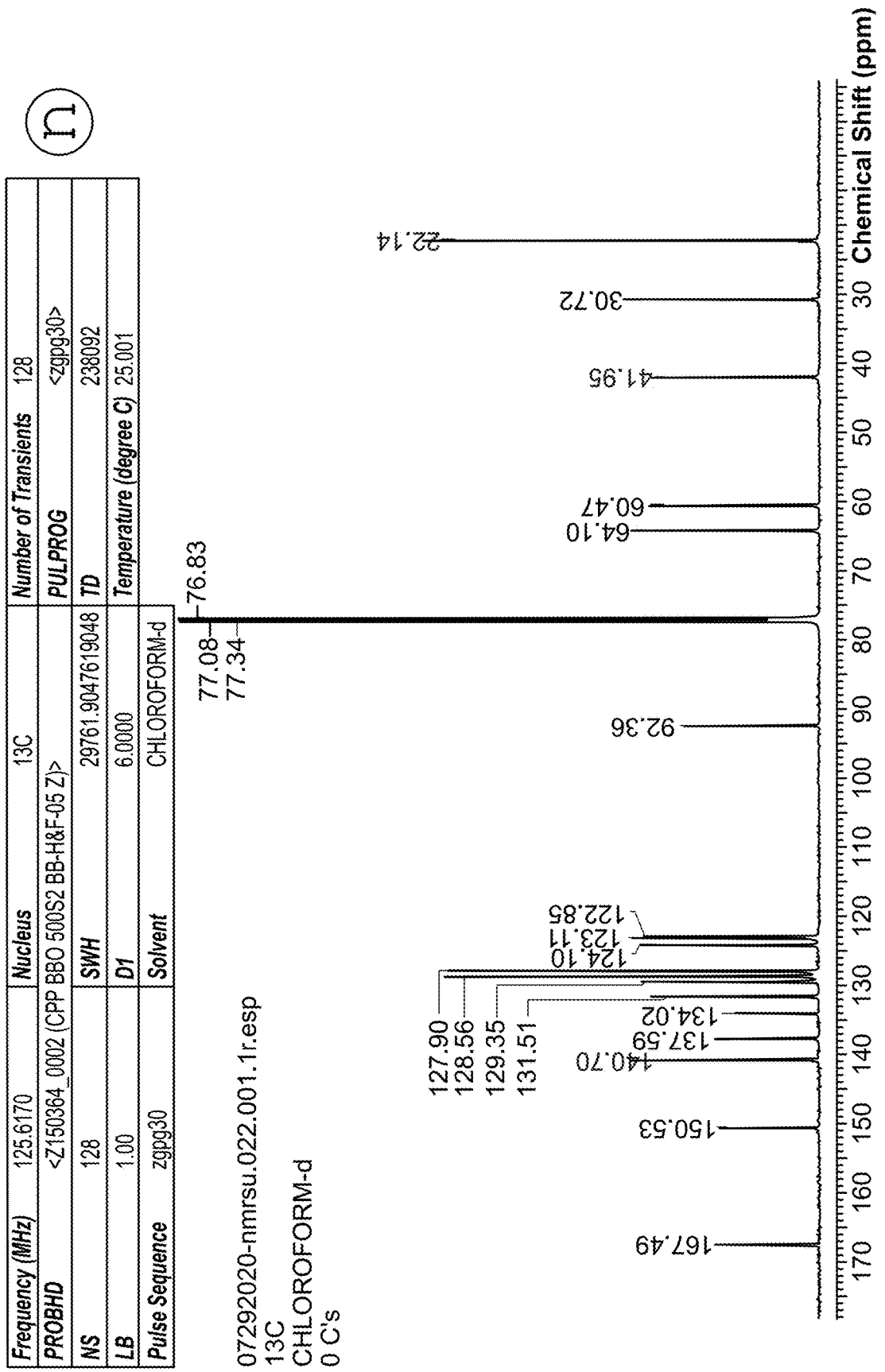

Compound A (8.14 g, 28.6 mmol), NaH (3.43 g), and the bromide (4.67 g) were reacted for 3 hr at room temperature. After quenching with water and extraction as before, 9.4 g of crude I-17 was isolated. The crude was purified by flash chromatography eluting with acetonitrile. The product was lyophilized to give 5.3 g of I-17 as a pink, thick oil/gum (HPLC: 98.85%; MS: M+H 367; $^1$H and $^{13}$C NMR represented in FIG. 3; PK data is shown in Table 7 below).

Example 8: Preparation of I-18

Preparation of the Halide 4-trifluoromethyl-1-[(1E)-3-bromo-1-propen-1-yl]-benzene for the Synthesis of I-18

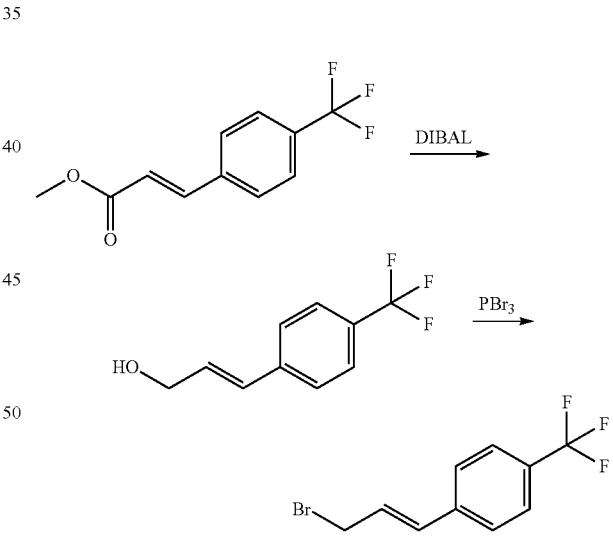

Figure 4:
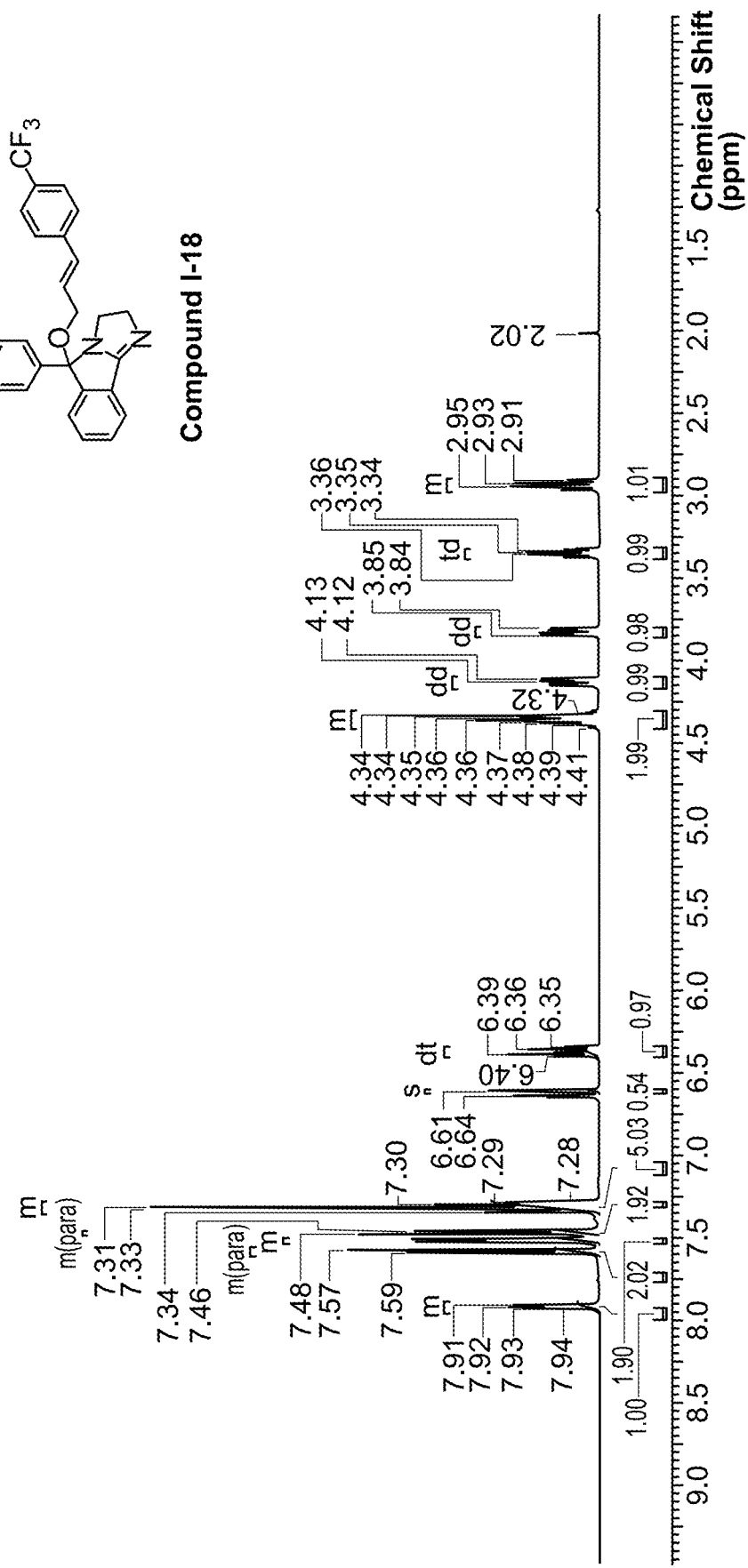
FIG. 4. shows the $^1$H and $^{13}$C NMR spectra of I-18 from Example 8.
Figure 4:
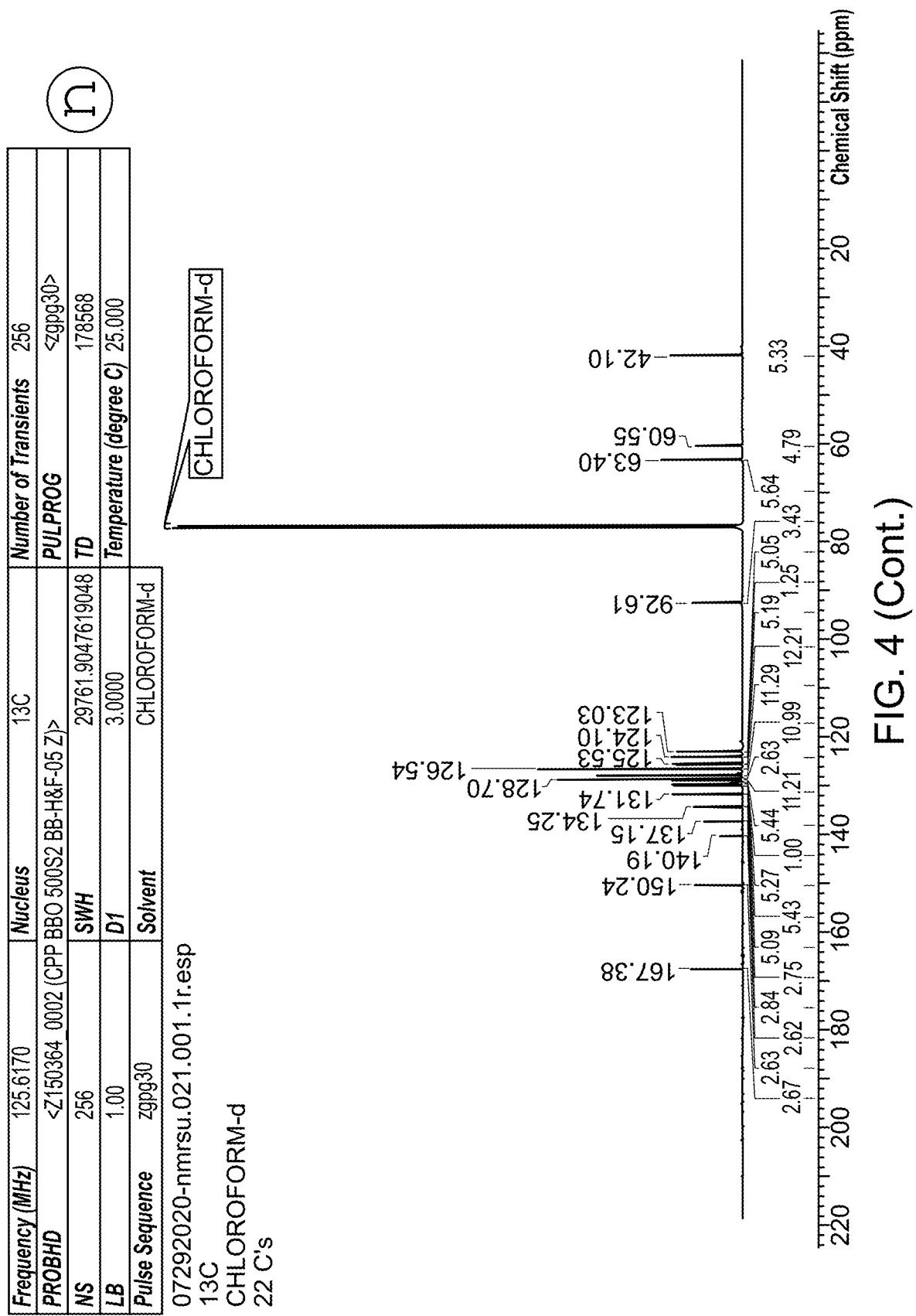

The halide 4-trifluoromethyl-1-[(1E)-3-bromo-1-propen-1-yl]-benzene used for the preparation of I-18 was prepared from the cinnamic ester by the method of Feringa (ACS Catal. 2016, 6, 6591-6595 (suppl)). 4-trifluoromethyl-1-[(1E)-3-bromo-1-propen-1-yl]-benzene was prepared via the reduction to the allylic alcohol with diisobutylaluminum hydride (DIBAL) followed by the conversion to the allylic bromide with PBr$_3$. The allylic bromide was used without further purification for the preparation of I-18 (HPLC: 98.9%; MS (M+H): 469; $^1$H and $^{13}$C NMR represented in FIG. 4; PK data is shown in Table 7 below).

Example 9: Preparation of I-19

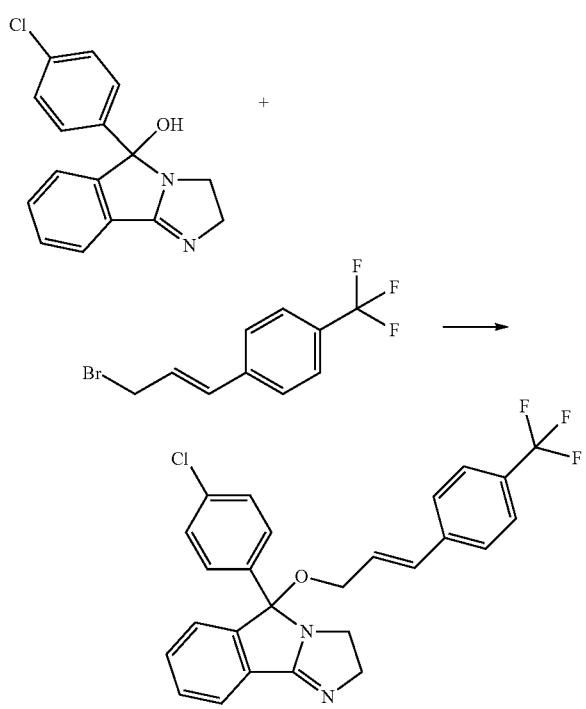

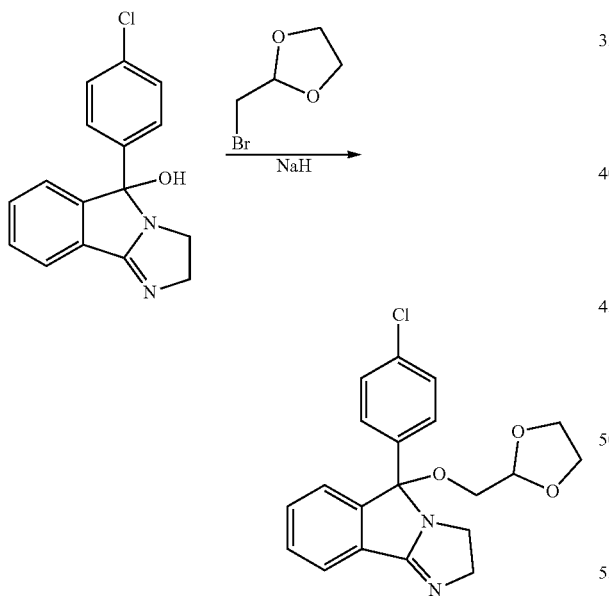

NaH (6 g, 60% dispersion in mineral oil; 150 mmol) was placed in a round-bottom flask, flushed with N₂ and washed with hexane (3×). To the flask, 50 mL of DMF was added. The mixture was stirred, and Compound A (14.3 g, 50 mmol) was added in portions over ca. 10 min. Then, the mixture was stirred for 20 min at room temperature. 2-bromomethyl-1,3-dioxolane (Oakwood; 15.03 g, 97 mmol) was added, and the mixture was stirred at room temperature for 30 min (TLC showed little reaction). The mixture was then heated at 60° C. for 5 hr, TLC showed ca. 32% of Compound A had reacted. The mixture was kept at room temperature overnight then heated at 60° C. for 2 hr, TLC showed about 35% unreacted Compound A.

Figure 5:
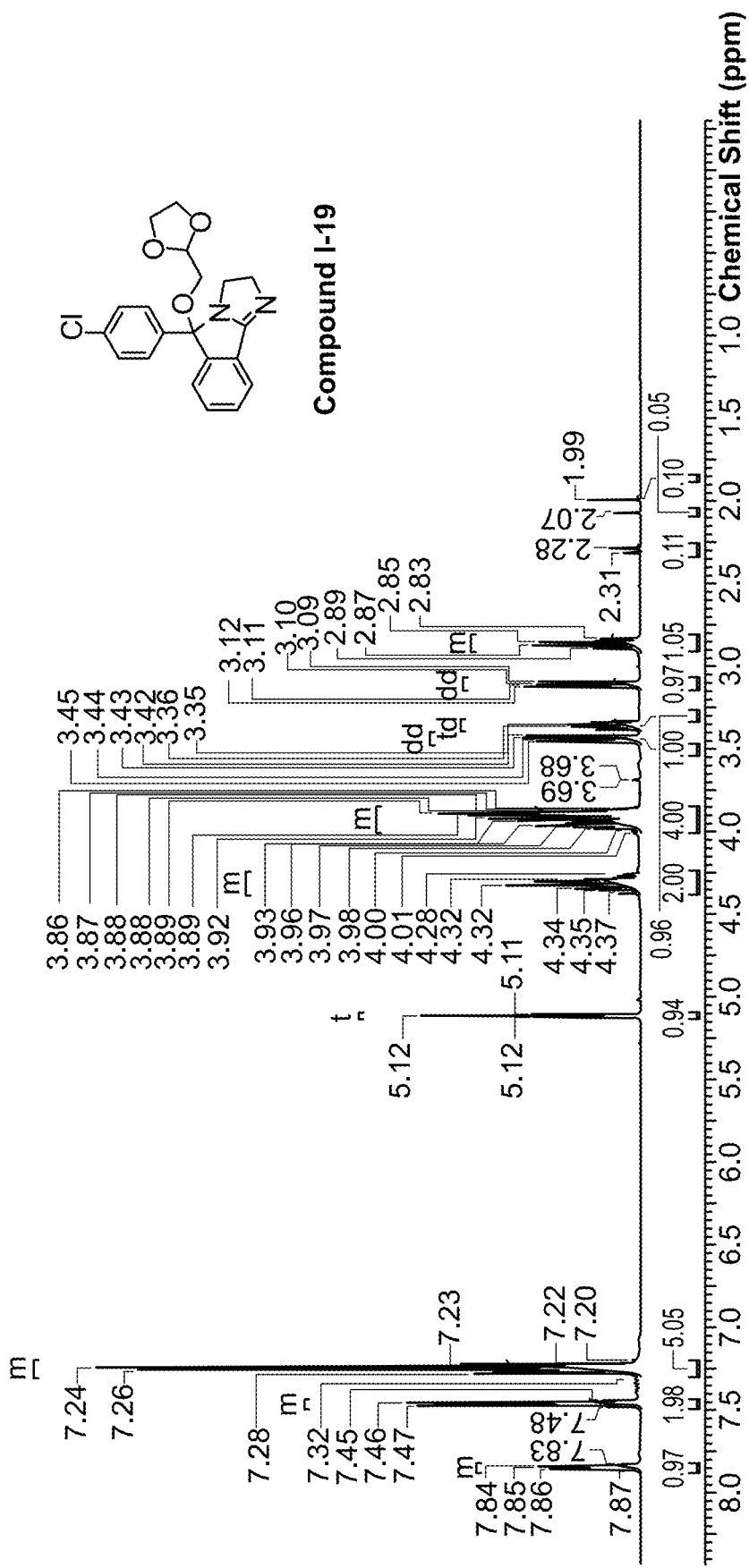
FIG. 5. shows the $^1$H and $^{13}$C NMR spectra of I-19 from Example 9.
Figure 5:
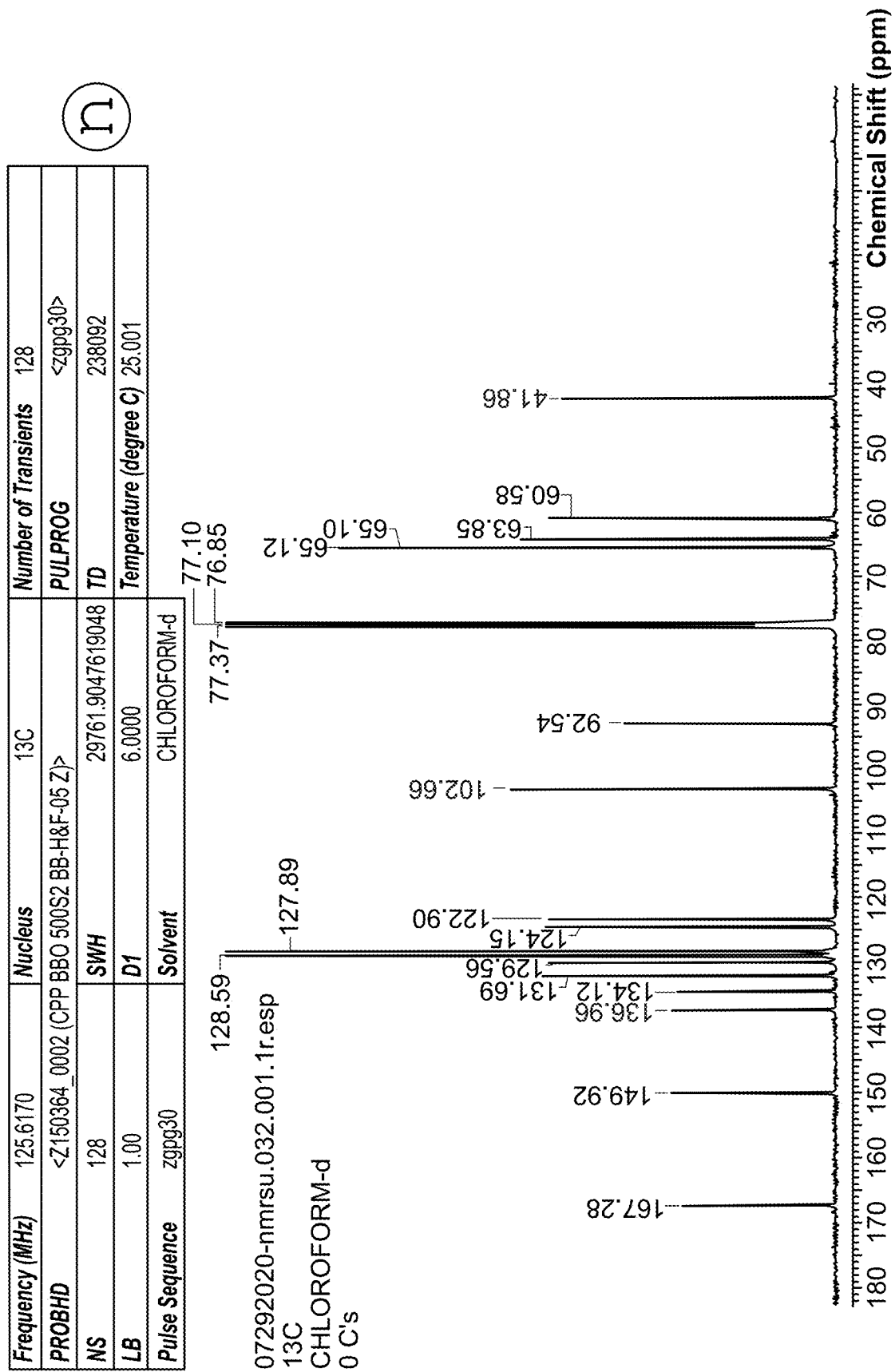

The mixture was cooled in an ice bath and the excess NaH was quenched by the addition of water in portions (total ca. 30 mL). EtOAc (100 mL) was added and the precipitated unreacted Compound A was removed by filtration. The filtrate was extracted with EtOAc (4×) and the combined extracts washed with brine (5×), dried over MgSO₄ and evaporated. Acetonitrile was added and the mixture filtered again to remove Compound A and the filtrate was evaporated to give 11.5 g of colorless oil that contained 24% Compound A by HPLC. The product was flash chromatographed and the product (4.7 g) was combined with a 0.5 g sample from another run that started with 4 mmol of Compound A. I-19 (5.2 g) was obtained after evaporating (using lyophilization method) from acetonitrile/water. The product was a clear, light pinkish yellow glass/gum (HPLC: 96.93%; MS (M+H): 371; $^1$H and $^{13}$C NMR represented in FIG. 5; PK data is shown in Table 7 below).

Example 10: Preparation of I-20 and O-Substituted Analogs

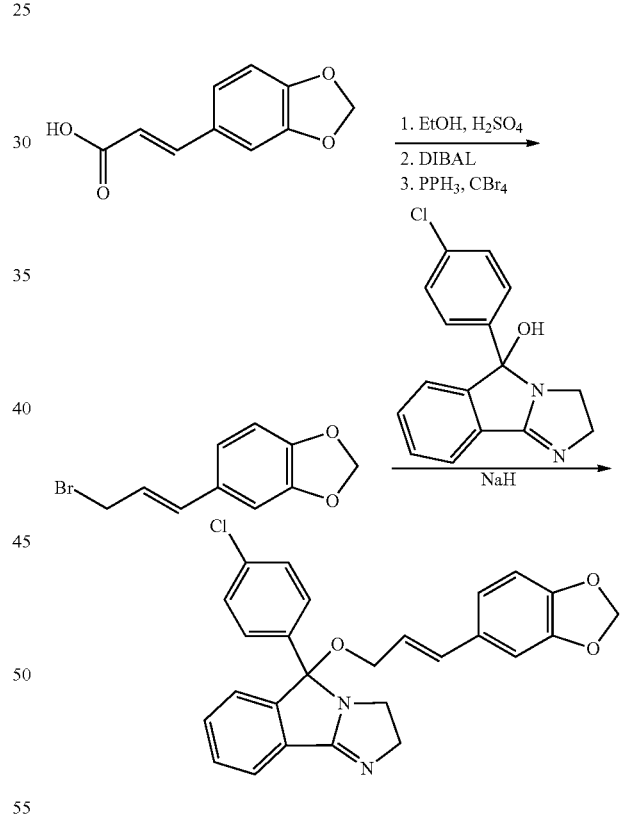

3,4-Methlenedioxycinnamic acid (10 g, 52 mmol) was dissolved in 100 mL of ethanol and 2 mL of concentrated sulfuric acid was added. The reaction mixture was heated to reflux for 6 hr. The ethanol volume was reduced to about half and extracted with 150 mL of EtOAc. The solution was washed with bicarbonate and brine and evaporated to give 11.4 g of the ethyl ester. A solution of ethyl 3,4-methylenedioxycinnamate (11 g, 50 mmol) in 100 mL of dichloromethane was cooled to −78° C. and 125 mL of diisobutylaluminum hydride (1.0 M in dichloromethane) was added slowly at −78° C. After 2 hr, the reaction mixture was quenched with water and 1 N NaOH and extracted with dichloromethane. The organic layer was dried over sodium sulfate and evaporated to give 9 g of 3,4-methylenedioxycinnamyl alcohol.

The 3,4-methylenedioxycinnamyl alcohol (1.78 g, 10 mmol) was dissolved in 40 mL of dichloromethane and cooled in an ice-water bath. And, a solution of carbon tetrabromide (3.64 g, 11 mmol) in 40 mL of methylene chloride was added followed by slow addition of a solution of triphenylphosphine (2.88 g, 11 mmol) in 5 mL of dichloromethane. After 1 hr at 0° C., the mixture was allowed to warm to room temperature for 1 hr. The mixture was diluted with 100 mL of 1:1 ether:hexane and the precipitate of triphenylphosphine oxide was removed by filtration through a bed of Celite® (diatomaceous earth) and washed with ether. The crude 3,4-methylenedioxycinnamyl bromide (2.41 g) was used immediately without further purification.

Figure 6:
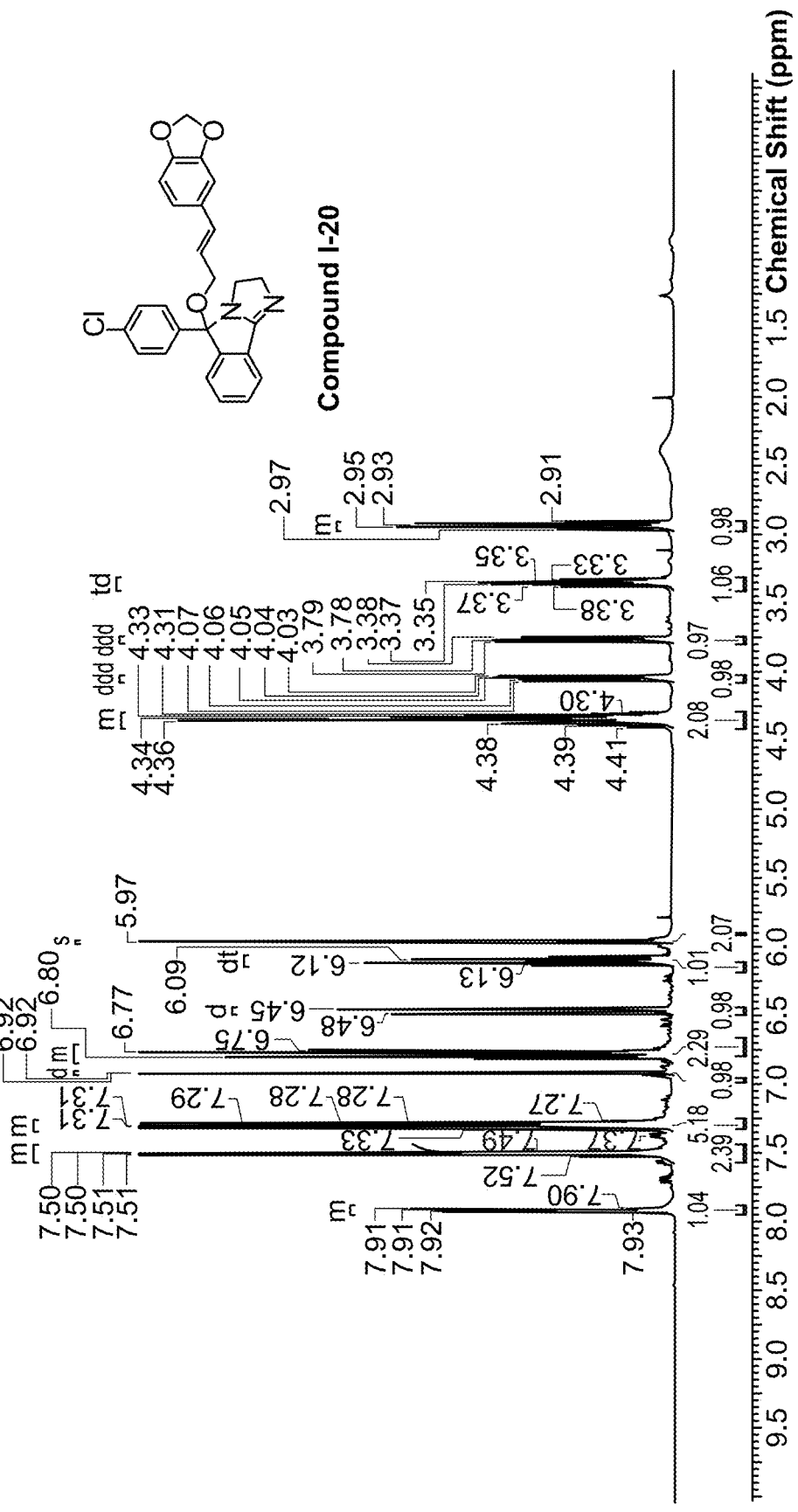
FIG. 6. shows the $^1$H and $^{13}$C NMR spectra of I-20 from Example 10.
Figure 6:
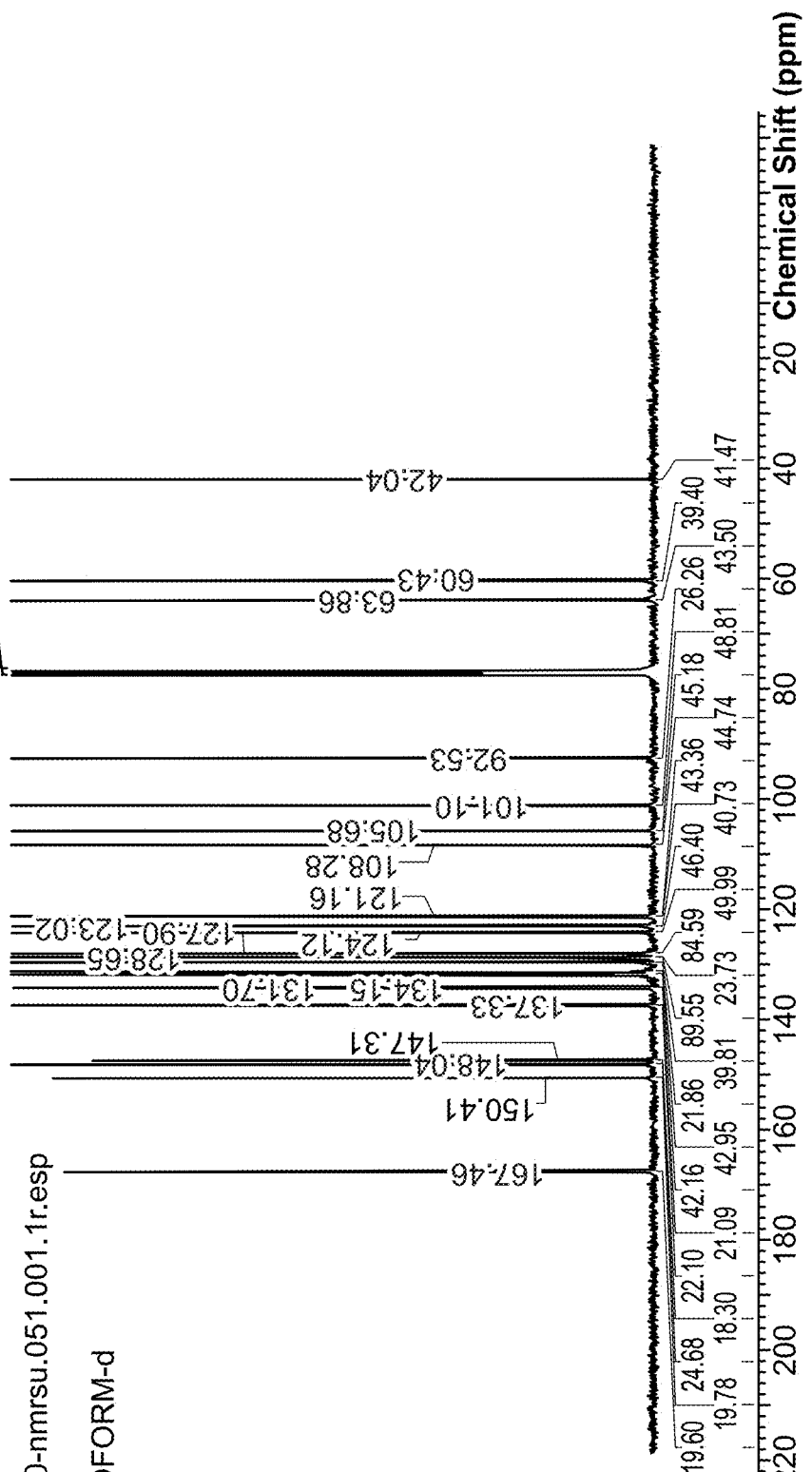

NaH (120 mg, 60% dispersion in mineral oil; 3.0 mmol) was placed in a round-bottom flask, flushed with $N_2$, and washed with 3 portions of hexane. To the flask, 10 mL of DMF was added. The mixture was stirred, and Compound A (284 mg, 10 mmol) was added in portions over ca. 10 min then the mixture was stirred for 30 min at room temperature. Then, 3,4-methylenedioxycinnamyl bromide (241 mg, 1.0 mmol; crude) in 1 mL of DMF was added and the mixture stirred for 2 hr. The reaction was quenched with ice-water, extracted with EtOAc, and the combined extracts were washed with water, brine, and then evaporated. The crude product was purified by column chromatography, eluting with 5% methanol in dichloromethane to give 1.2 g of I-20 as a tan oil. Samples of the chromatographed product (total of 5.4 g) were dissolved in 120 mL of acetonitrile, decolorized with Norit® (activated carbon) and filtered through Celite® (diatomaceous earth). The acetonitrile solution was diluted with 50 mL of water lyophilized to give 5.1 g of tan solid (HPLC: 95.52%; MS (M+H): 445; $^1H$ and $^{13}C$ NMR represented in FIG. 6).

Preparation of the Cinnamyl Halide for Derivatives I-21, I-22, and I-23

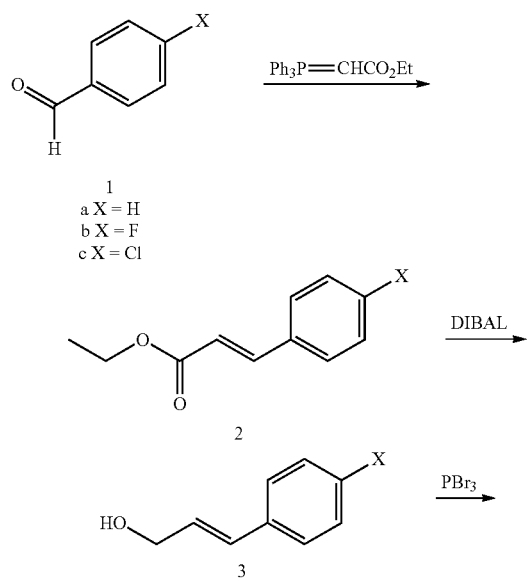

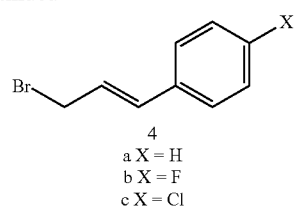

4
a X = H
b X = F
c X = Cl

The cinnamyl halide 1-[(1E)-3-bromo-1-propen-1-yl]-4-fluorobenzene (4b) and the chloro analog (4c) were prepared by the method of Perez-Estrada, Sayar, and Granja (Org. Chem. Front., 2016, 3, 1331-1336 (suppl)) via the Wittig reaction of 4-fluorobenzaldehyde (1b) or 4-chlorobenzaldehyde (1c) with ethyl triphenylphosphorylidine acetate to give unsaturated esters (2b, 2c). The reaction was followed by the reduction to the allylic alcohols (3b, 3c) with diisobutylaluminum hydride (DIBAL) and the conversion to the allylic bromides (4b, 4c) with phosphorus tribromide. The allylic bromides were used without further purification.

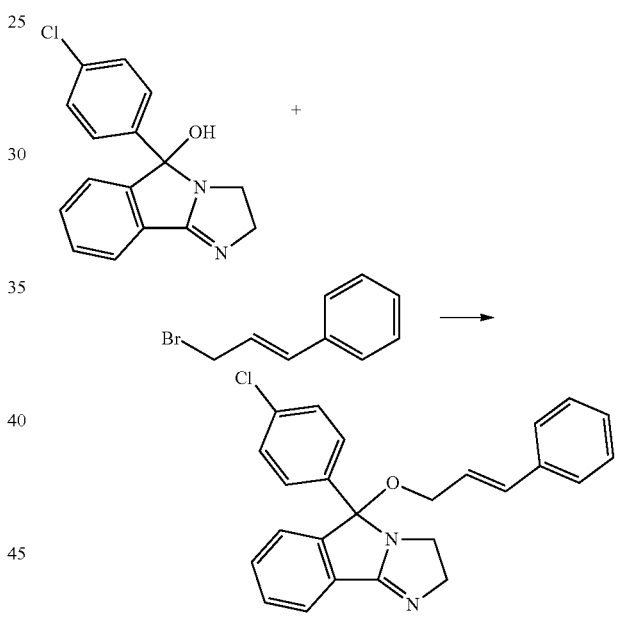

Compound A (560 mg, 2.0 mmol) was suspended in 10 mL of DMF. NaH (60%, 240 mg, 6 mmol) was added and the solution was stirred at room temperature for 30 min. Cinnamyl bromide (4a) (558 mg, 3.0 mmol; Sigma-Aldrich) was added to the mixture. The mixture was stirred at room temperature for 2 hr and was quenched with water. It was then extracted with EtOAc (3×30 mL). The combined organic phase was washed with saturated NaCl (5×30 mL), and was dried with $MgSO_4$. The concentrated crude product was purified by flash chromatography by eluting with $CH_3CN$ ($CH_3CN$:isopropanol in 2:1 ratio) to give 100 mg of product (HPLC 98% pure; MS M+H 419).

A similar method may be used for the preparation of derivatives I-21, I-22 (the fluoro analog), and I-23 (the chloro analog) using corresponding halide. Table 3 below shows the amount obtained of each compound.

TABLE 3

Amount obtained of I-20, I-22, and I-23.

| Compound | Cinnamyl Halide (X-R) | Amount obtained |
|---|---|---|
| I-21 | (E)-5-(3-bromoprop-1-en-1-yl)benzo[d][1,3]dioxole | 65 mg |
| I-22 | 4-fluoro-1-[(1E)-3-bromo-1-propen-1-yl]-benzene | 130 mg |
| I-23 | 4-chloro-1-[(1E)-3-bromo-1-propen-1-yl]-benzene | 150 mg |

Example 11: Preparation of I-23

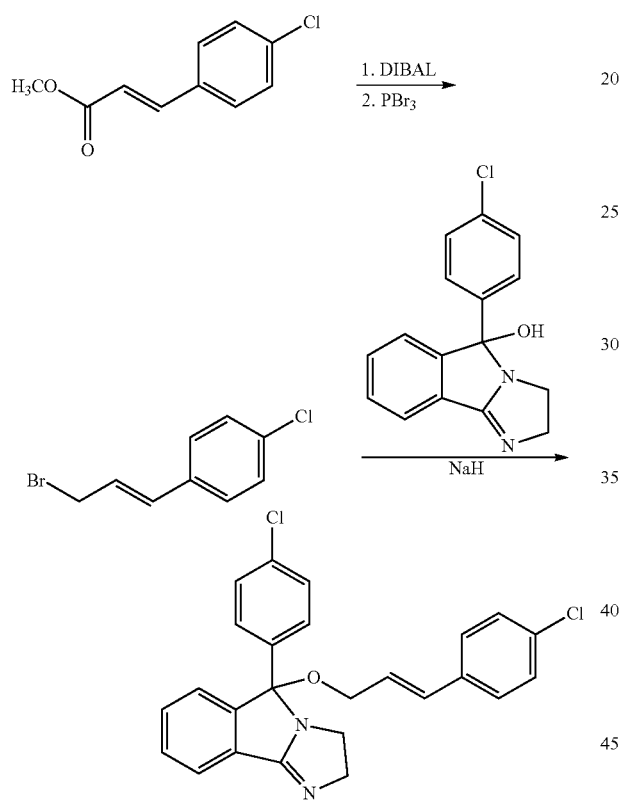

Methyl-4-chlorocinnamate (Combi-Blocks; 7.86 g, 40 mmol) was dissolved in 30 mL dichloromethane and cooled to −78° C. Diisobutylaluminum hydride (Aldrich, 1.0 M in dichlormethane; 100 mL, 100 mmol) was added dropwise at −78° C. and stirred for 2 hr. Water (20 mL) was added to the mixture followed by a solution of 4 g of NaOH in 20 mL of water, and the mixture was allowed to warm to room temperature. After warming to room temperature, the mixture was filtered through Celite® (diatomaceous earth). The layers were separated, and the aqueous phase was extracted with dichloromethane (2×). The combined extract was washed with brine (3×), dried with MgSO$_4$, and evaporated to give 6.14 g of the intermediate alcohol as a white solid that was used without further purification.

The crude alcohol (40 mmol) was dissolved in 30 mL of ether and cooled to 0° C. And, 3.75 mL of PBr$_3$ (40 mmol) in 5 mL of ether was added, and the solution stirred for 2 hr. To the solution, 100 mL of saturated sodium bicarbonate was added (until no further CO$_2$ bubbled), and the mixture was extracted with ether (3×50 mL). The combined extracts were washed with brine (2×), dried with MgSO$_4$, and evaporated to give the allylic bromide as a solid. The solid was dissolved in 30 mL of dichloromethane, redried over MgSO$_4$, and evaporated to give 7.63 g of the bromide as a colorless white solid.

Figure 7:
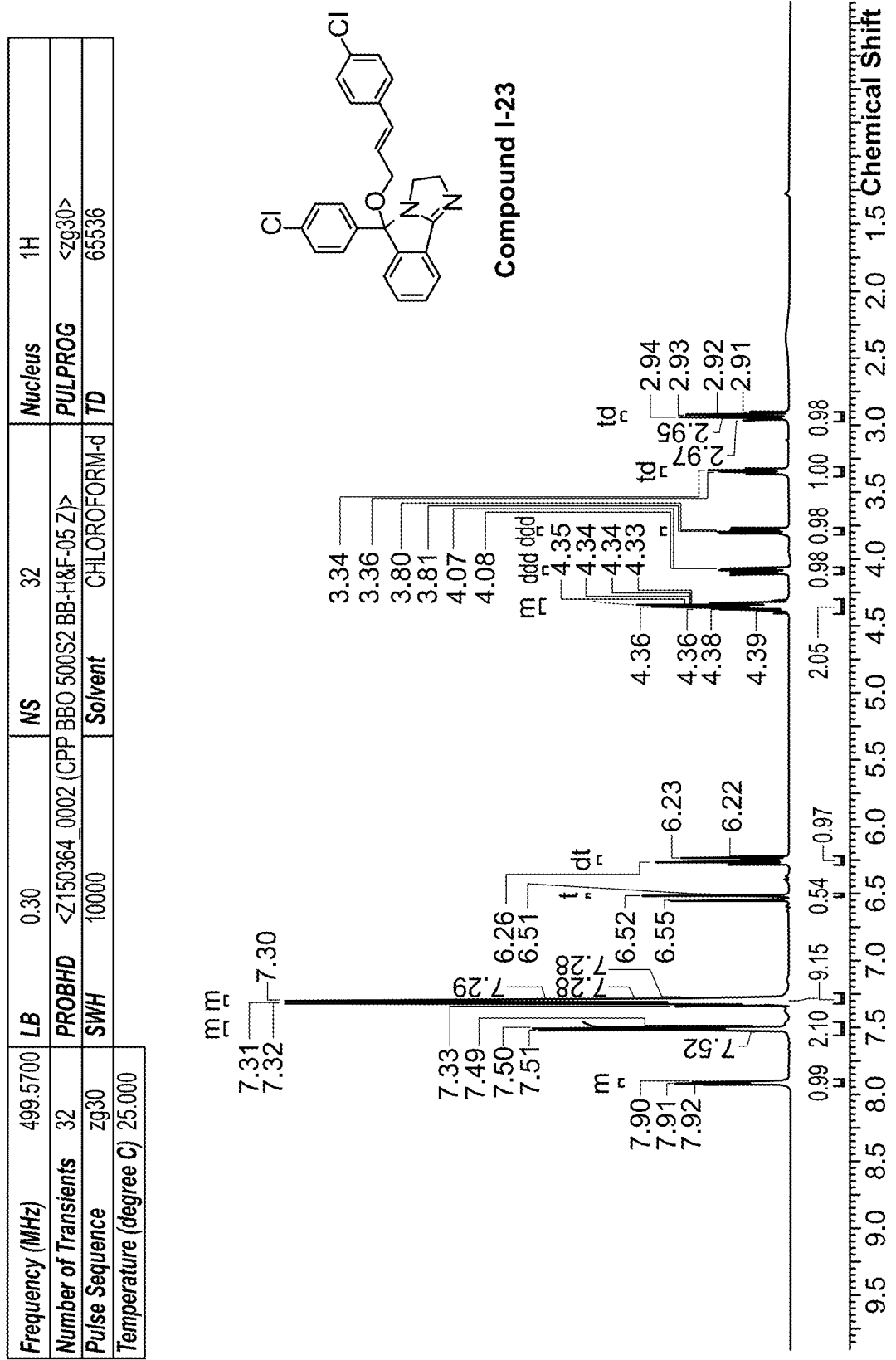
FIG. 7. shows the $^1$H and $^{13}$C NMR spectra of I-23 from Example 11.
Figure 7:
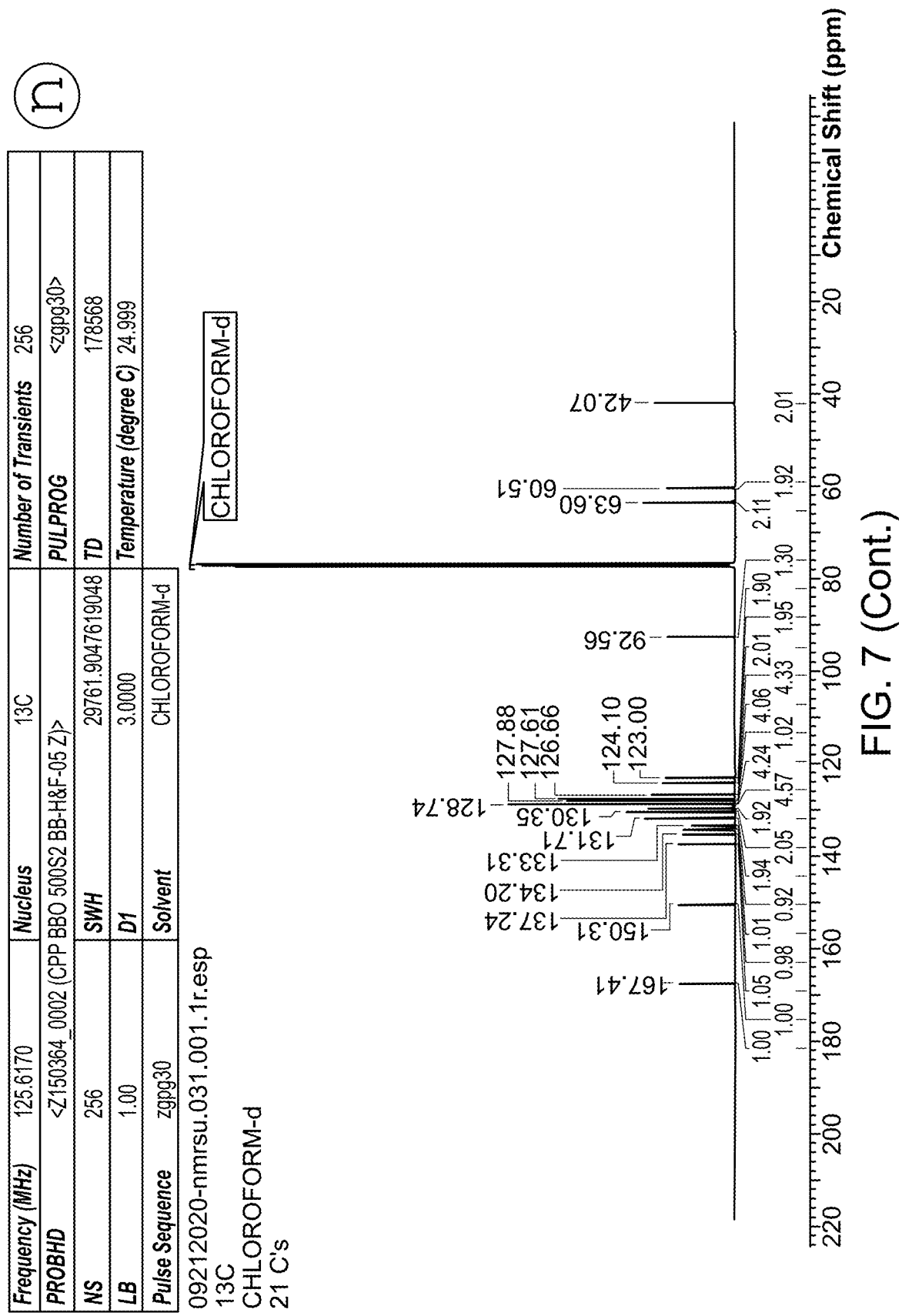

2.75 g of NaH dispersion (69 mmol) in 20 mL of DMF was treated with Compound A (7.8 g, 27.5 mmol) and 20 mL of added DMF and allowed to stir 20 min at room temperature. Then, the cinnamyl bromide 7.63 g, 33 mmol was added and the mixture stirred for 2 hr. Water was added and the mixture was extracted with EtOAc (4×). The combined extracts were washed with brine (2×) and with Na$_2$S$_2$O$_3$ (1×), brine (3×), and dried over MgSO$_4$. The solution was then decolorized with Norit® (activated carbon), filtered through Celite® (diatomaceous earth), and evaporated to give 16 g of crude product as a light brown oil. The crude product was purified by flash chromatography to give 6.04 g of pure product I-23 as a white solid (HPLC: 97.7%; MS (M+H): 436; $^1$H and $^{13}$C NMR represented in FIG. 7).

Example 12: Synthesis of II-2 and Preparation of N-acyl Analogs

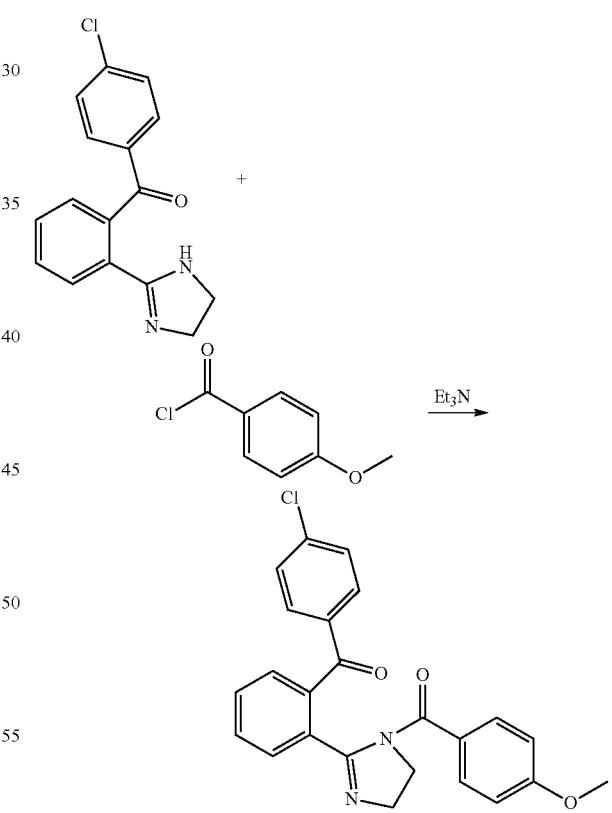

Compound A (190 mg, 0.67 mmol) was suspended in 3 mL of DMF and trimethylamine (Et$_3$N) (0.28 mL, 2 mmol) was added to the suspension. Following the addition of 4-methoxybenzoyl chloride (230 mg, 1.34 mmol), the mixture was stirred at room temperature for 2 hr and was quenched with water. It was then extracted with EtOAc (4×20 mL). The combined organic phase was washed with saturated NaCl (5×20 mL) and was dried over MgSO$_4$. The concentrated crude product was purified by HPLC by eluting with 25%-80% CH$_3$CN in H$_2$O to give 228 mg of product. The yield for the preparation of II-2 was 81% (PK data is shown in Table 9 below).

Derivatives II-1 and II-3 were prepared using the same method to prepare II-2. Table 4 below shows the amount of each compound obtained:

TABLE 4

Amounts of II-1 and II-3 obtained.

| Compound | Halide | Amount obtained |
|---|---|---|
| II-1 | benzyl chloride | 60 mg |
| II-3 | 4-methyl benzoyl chloride | 203 mg |

(PK data for II-1 is shown in Table 8 below; PK data for II-3 is shown in Table 6 below)

Example 12: Scaled-Up Synthesis of II-2

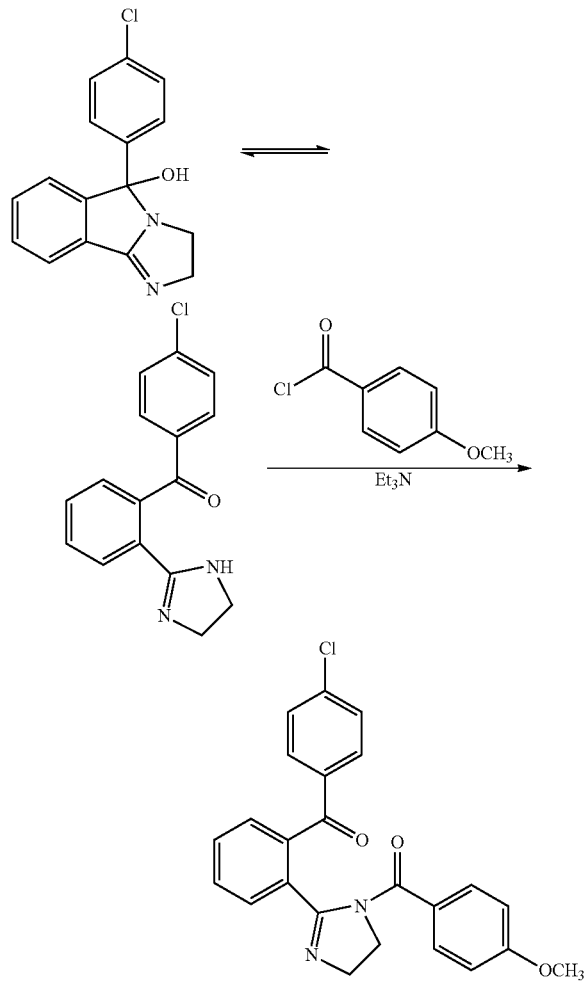

Compound A (11.39 g, 40 mmol) was suspended in 50 mL of DMF. To the mixture, triethylamine (13.9 mL, 100 mmol) was added, and the mixture was stirred at room temperature. Slowly, a solution of 4-methoxybenzoyl chloride (10.23 g, 60 mmol) in 10 mL of DMF was added to the mixture. Compound A gradually dissolved as some other solid pre-cipitated. The mixture (brown color) was stirred at room temperature for 2 hr. Water (100 mL) was added, and the solution was extracted with EtOAc (4×). The combined extracts were washed with brine (2×), bicarbonate (1×), and brine (3×), then dried over MgSO$_4$ and treated with Norit® (activated carbon).

Figure 8:
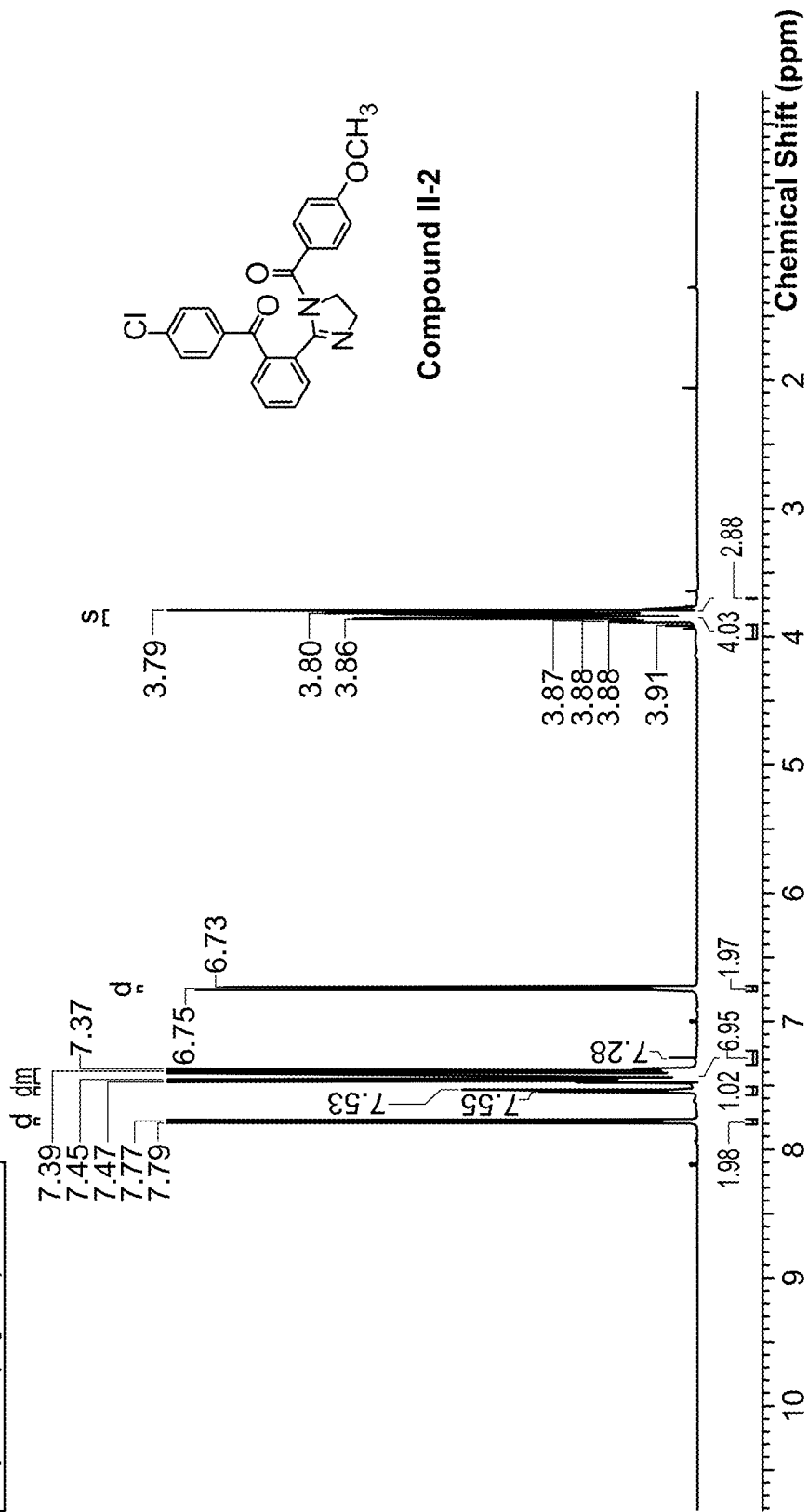
FIG. 8. shows the $^1$H and $^{13}$C NMR spectra of II-2 from Example 12.
Figure 8:
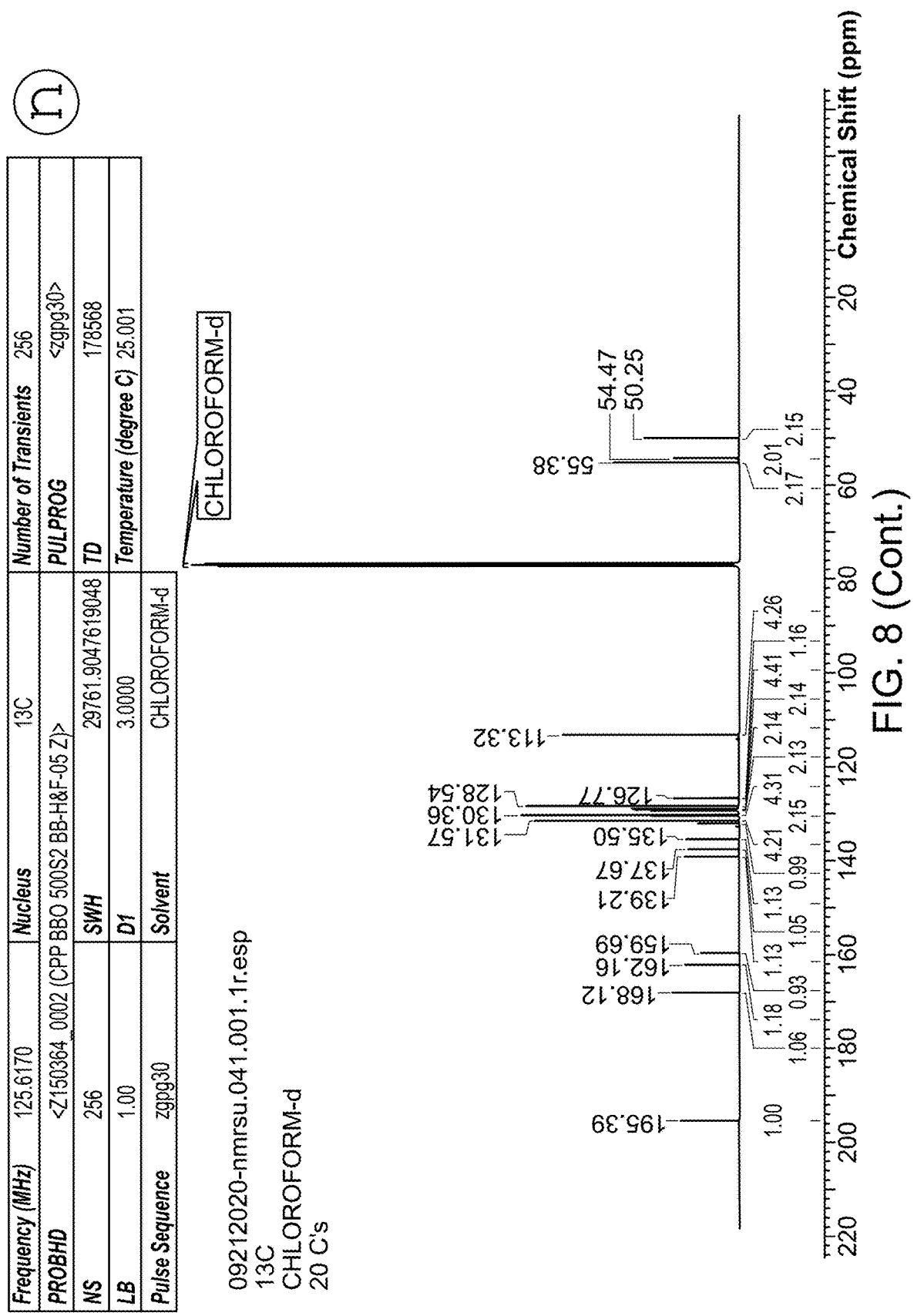

The solvent was evaporated to give a yellow-orange oil. Ether (15 mL) was added (oil) and then 20 mL of hexane was added (discarding the hexane layer) and this procedure was repeated twice. TLC (9:1 ratio of dichloromethane: methanol) showed the crude product contained a non-polar compound, product, plus minor contaminants, which were removed by the ether and hexane wash of the crude product. 20 mL of EtOAc was added, and II-2 crystallized out and was isolated by filtration. The product II-2 (10.1 g) was obtained as a white solid (HPLC: 99.5%; MS: M+H 357; $^1$H and $^{13}$C NMR represented in FIG. 8; PK data for II-2 is shown in Table 9 below).

Example 13: Preparation of II-4, II-5, II-6

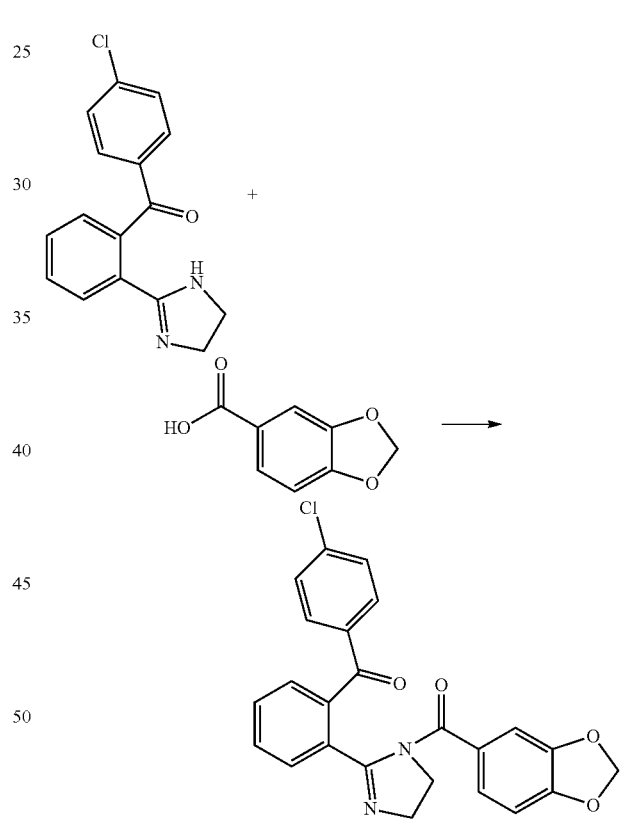

Piperonylic acid (160 mg, 0.95 mmol) and HATU (1-[Bis (dimethylamino)methylene]-1H-1,2,3-triazolo[4,5-b]pyridinium 3-oxide hexafluorophosphate) (360 mg, 0.95 mmol) were dissolved in 2 mL of DMF. DIPEA (diisopropylethylamine) (0.28 mL, 1.6 mmol) was added to the mixture, and the mixture was stirred at room temperature for 5 min. Compound A (180 mg, 0.63 mmol) was added to the mixture, followed by the addition of 0.28 mL of DIPEA. After the mixture was stirred at room temperature for 2 hr, the mixture was quenched with water and was extracted with EtOAc (4×20 mL). The combined organic phase was washed with saturated NaCl (5×20 mL) and was dried with MgSO$_4$. The concentrated crude product was purified by HPLC by eluting with 20%-90% CH$_3$CN in H$_2$O to give 110 mg of product. The yield of the preparation of II-4 was 41% (PK data is shown in Table 6 below).

Derivatives II-5 and II-6 were prepared using the same method to prepare II-4. Table 5 below shows the corresponding halide and protected amino acid residue with the amount obtained:

TABLE 5

Amount obtained of derivative II-5 and II-6

| Compound | Halide | Amount obtained |
|---|---|---|
| II-5 | Boc-valine | 25 mg |
| II-6 | N-methylpiperazine-1-carbonyl chloride | 25 mg |

(PK data for II-5 and II-6 is shown in Table 9 below)

Example 13: Preparation of II-7

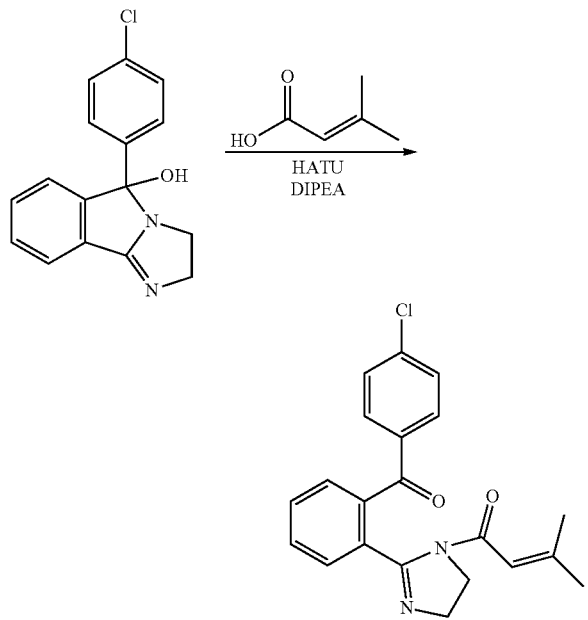

3,3-dimethylacrylic acid (96 mg, 0.96 mmol) and HATU (366 mg, 0.96 mmol) were mixed in 2 mL of DMF and 280 µL of DIPEA was added to the mixture. After the addition of Compound A (183 mg, 0.64 mmol), the mixture was stirred for 2 min. Additional DIPEA (280 µL) was added to the solution, and the yellow solution was stirred at room temperature for 2 hr. After the addition of water, the mixture was extracted with EtOAc (4×). The extract was washed with brine (4×), was dried over MgSO$_4$, and was evaporated. The crude product was dissolved in a solution of acetonitrile/water and kept at room temperature overnight (significant decomposition occurred). This material was purified by prep HPLC to obtain 58 mg of II-7 (86% pure) that contained a later eluting byproduct. A sample was assayed for stability in water (63% at the 24-hour time point) and in a pH 7.4 buffer (77% at the 24 hour time point).

Example 14: Preparation of II-8

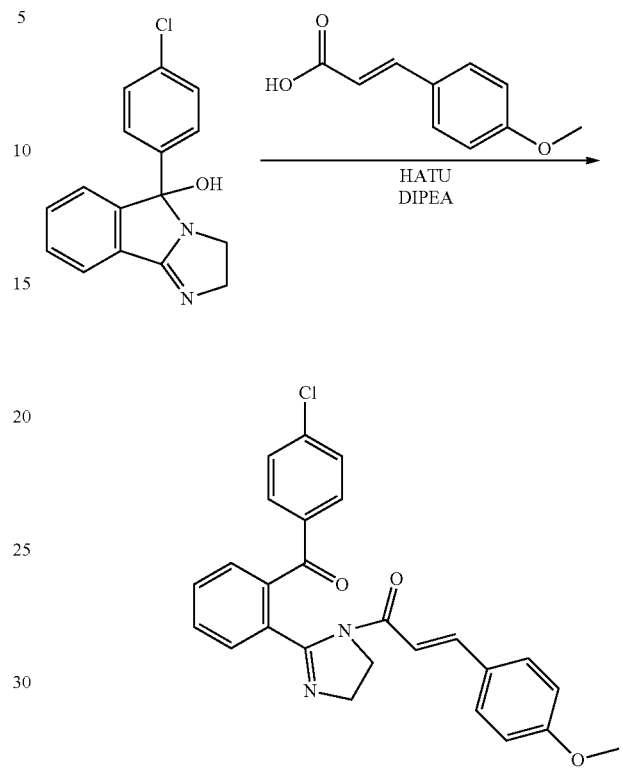

4-Methoxycinnamic acid (160 mg, 0.9 mmol) and HATU (342 mg, 0.9 mmol) were mixed in 3 mL of DMF and 260 µL of DIPEA was added to the mixture. Compound A (170 mg, 0.6 mmol) was added, and the mixture was stirred for 2 min. Additional DIPEA (260 µL) was added, and the yellow solution was stirred at room temperature for 2 hr. After water was added, the mixture was extracted with EtOAc (4×). The extract was washed with brine (4×), was dried over MgSO$_4$, and was evaporated. HPLC showed mainly the product II-8 plus Compound A and the ring opened byproduct. It was immediately purified by HPLC, but after the preparatory HPLC and lyophilization (total 90 mg) the byproduct had increased to approximately 50% of the product.

Example 15: Preparation of II-9

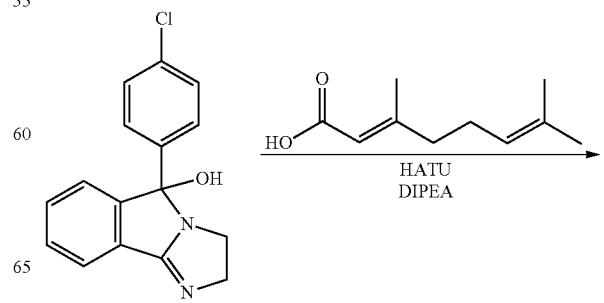

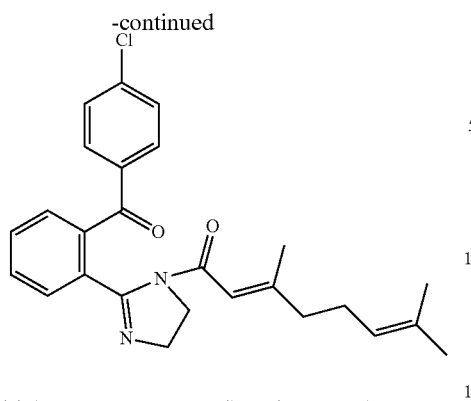

Geranic acid (206 mg, 0.96 mmol) and HATU (366 mg, 0.96 mmol) were mixed in 2 mL of DMF. Following the addition of 280 μL of DIPEA to the solution, Compound A (180 mg, 0.64 mmol) was added to the solution, and the mixture was stirred for 2 min. Additional DIPEA (280p L) was added, and the yellow solution was stirred at room temperature for 2 hr. Following the addition of water, the mixture was extracted with EtOAc (4×). The extract was washed with brine (4×), was dried over $MgSO_4$, and was evaporated. The crude product II-9 appeared by HPLC to be over 70% in one peak. The crude product was dissolved in acetonitrile/water and was kept at room temperature overnight (complete decomposition occurred).

Example 16: Synthesis of N-acyl Dimer, III-1

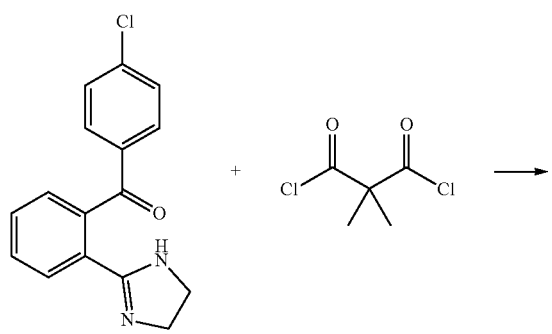

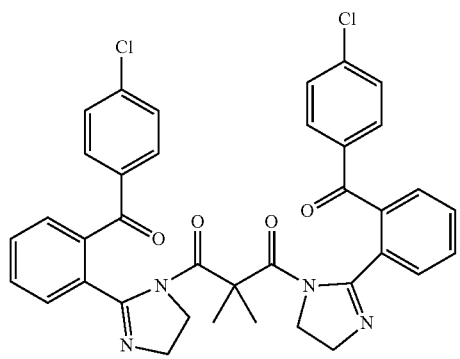

Compound A (505 mg, 1.78 mmol) was suspended in 5 mL of DMF. After the addition of $Et_3N$ (0.74 mL, 5.3 mmol) and dimethylmalonyl chloride (0.14 mL, 1.06 mmol) to the suspension, the mixture was stirred at room temperature for 2 hr and was quenched with water. It was then extracted with EtOAc (4×20 mL). The combined organic phase was washed with saturated NaCl (5×20 mL) and was dried with $MgSO_4$. The concentrated crude product was purified by HPLC by eluting with 25%-90% $CH_3CN$ in $H_2O$ to give 97 mg of product. The yield for the preparation of III-1 was 16% (PK data is shown in Table 9 below).

Example 17: Pharmacokinetic Data for Compound A Derivatives

Pharmacokinetic (PK) data was generated using twelve CD-1 mice treated with oral administration of the compound with a dose volume of 10 mg/kg (a molar equivalent to 5-(4-chlorophenyl)-2,3-dihydroimidazo[1,2-b]isoindol-5-ol ("Compound A," "Cmpd. A," or "A")), and a nominal strength of 1 mg/mL. The serum was analyzed in triplicate with 200 mM $K_2EDTA$ anticoagulant.

PK data for the derivatives are shown in Tables 6 to 10 below.

TABLE 6

Pharmacokinetic data comparing Compound A ("Cmpd. A," or "A"), with derivatives (DV) I-1, I-2, II-3, II-4, and I-9.

| Cmpd | Dose of Cmpd. A DV salt (mg/kg) | Actual Dose of Cmpd. A DV salt (mg/kg) | Accuracy Dose Formulation (%) | Actual Mol. Eq. dose of Cmpd. A (mg/kg) | Analyte | $T_{max}$ (hr) | $C_{max}$ (ng/mL) | $AUC_{last}$ (ng · hr/mL) | $AUC_{inf}$ (ng · hr/mL) | $T_{1/2}$ (hr) | Active/DV $C_{max}$ ratio | Active/DV $AUC_{last}$ ratio | DV/Cmpd. A Dosed $AUC_{last}$ ratio |
|---|---|---|---|---|---|---|---|---|---|---|---|---|---|
| Cmpd A | NA | NA | 118 | 11.8 | DV Cmpd. A (Active) | — 0.50 | — 149.0 | — 226.0 | — 229.0 | — 1.4 | NA | NA | NA |
| I-1 | 13.2 | 12.8 | 97.0 | 9.70 | I-1 A | 0.25 0.25 | 68.2 23.3 | 137.0 35.8 | 141.0 86.7 | 1.6 4.7 | 0.34 | 0.26 | 0.16 |
| I-2 | 14.2 | 17.04 | 120.0 | 12.00 | I-2 A | 0.25 0.25 | 234.0 32.3 | 260.0 78.7 | 268.0 85.1 | 1.8 2.3 | 0.14 | 0.30 | 0.35 |
| II-3 | 14.1 | 11.99 | 85.0 | 8.50 | II-3 A | 0.25 0.25 | 81.6 12.4 | 163.0 5.8 | 182.0 NR | 2.2 NR | 0.15 | 0.04 | 0.03 |

TABLE 6-continued

Pharmacokinetic data comparing Compound A ("Cmpd. A," or "A"), with derivatives (DV) I-1, I-2, II-3, II-4, and I-9.

| Cmpd | Dose of Cmpd. A DV salt (mg/kg) | Actual Dose of Cmpd. A DV salt (mg/kg) | Accuracy Dose Formulation (%) | Actual Mol. Eq. dose of Cmpd. A (mg/kg) | Analyte | $T_{max}$ (hr) | $C_{max}$ (ng/mL) | $AUC_{last}$ (ng · hr/mL) | $AUC_{inf}$ (ng · hr/mL) | $T_{1/2}$ (hr) | Active/ DV $C_{max}$ ratio | Active/ DV $AUC_{last}$ ratio | DV/ Cmpd. A Dosed $AUC_{last}$ ratio |
|---|---|---|---|---|---|---|---|---|---|---|---|---|---|
| II-4 | 15.2 | 17.63 | 116.0 | 11.60 | II-4 | 0.25 | 50.3 | 236.0 | 238.0 | 1.2 | NA | NA | NA |
|  |  |  |  |  | A | NC (BLQ at all the time points) | | | | | | | |
| I-9 | 12.4 | 14.88 | 120.0 | 12.00 | I-9 | 0.25 | 124 | 55.1 | 59.8 | 1.42 | 1.57 | 2.85 | 0.69 |
|  |  |  |  |  | A | 0.25 | 195 | 157 | 221 | 2.91 | | | |

TABLE 7

Pharmacokinetic data comparing compound A ("Cmpd. A," or "A") with derivatives (DV) I-14, I-15, I-16, I-17, I-18, and I-19

| Cmpd | Nominal Dose of Cmpd. A DV salt (mg/kg) | Administered Dose of Cmpd. A DV salt (mg/kg) | Analyte | $T_{max}$ (hr) | $C_{max}$ (ng/mL) | $AUC_{last}$ (ng · hr/mL) | $AUC_{inf}$ (ng · hr/mL) | $T_{1/2}$ (hr) |
|---|---|---|---|---|---|---|---|---|
| Cmpd A | 5.10 | 4.80 | DV A | — | — | — | — | — |
|  |  |  | A | 0.500 | 143 | 179 | 189 | 0.885 |
| I-14 | 7.78 | 7.25 | I-14 | 0.500 | 56.1 | 183 | 215 | 2.72 |
|  |  |  | A | 0.833 | 4.24 | 21.9 | 58.6 | 11.7 |
| I-15 | 7.83 | 7.74 | I-15 | 0.333 | 17.8 | 12.7 | 16.0 | 0.496 |
|  |  |  | A | 0.583 | 4.58 | 7.23 | 21.7 | 3.27 |
| I-16 | 7.26 | 6.76 | I-16 | 0.583 | 53.3 | 174 | 224 | 3.24 |
|  |  |  | A | 2.33 | 4.91 | 18.4 | ND | ND |
| I-17 | 6.57 | 6.74 | I-17 | 0.250 | 25.7 | 27.6 | 33.2 | 1.30 |
|  |  |  | A | 0.417 | 97.9 | 236 | 259 | 2.49 |
| I-18 | 8.40 | 8.99 | I-18 | 0.500 | 187 | 677 | 792 | 3.95 |
|  |  |  | A | 0.500 | 35.1 | 114 | 137 | 3.14 |
| I-19 | 6.65 | 6.74 | I-19 | 0.333 | 4.27 | 2.04 | ND | ND |
|  |  |  | A | 0.333 | 158 | 203 | 211 | 0.855 |

TABLE 8

Pharmacokinetic data comparing compound A ("Cmpd. A," or "A") with derivatives (DV) II-1, I-3, I-4, I-6, and I-7

| Cmpd | Dose of Cmpd. A DV salt (mg/kg) | Actual Dose of Cmpd. A DV salt (mg/kg) | Accuracy Dose Formulation (%) | Actual Mol. Eq. dose of Cmpd. A (mg/kg) | Analyte | $T_{max}$ (hr) | $C_{max}$ (ng/mL) | $AUC_{last}$ (ng · hr/mL) | $AUC_{inf}$ (ng · hr/mL) | $T_{1/2}$ (hr) | Active/ DV $C_{max}$ ratio | Active/ DV $AUC_{last}$ ratio | DV/ Cmpd. A Dosed $AUC_{last}$ ratio |
|---|---|---|---|---|---|---|---|---|---|---|---|---|---|
| Cmpd A | NA | NA | 118.0 | 11.80 | DV Cmpd A (Active) | — 0.5 | — 149 | — 226 | — 229 | — 1.36 | NA | NA | NA |
| II-1 | 13.7 | 15.21 | 111.0 | 11.10 | II-1 | 0.25 | 43 | 19.8 | 21.8 | 1.67 | 0.37 | 0.50 | 0.04 |
|  |  |  |  |  | A | 0.25 | 15.8 | 9.87 | NR | NR | | | |
| I-3 | 11.4 | 9.69 | 85.0 | 8.50 | I-3 | 0.5 | 52.9 | 73.7 | 88.9 | 1.7 | 0.44 | 1.37 | 0.45 |
|  |  |  |  |  | A | 1 | 23.1 | 101 | NR | NR | | | |
| I-4 | 12 | 12.36 | 103.0 | 10.30 | I-4 | 0.25 | 475 | 568 | 586 | 1.8 | 0.06 | 0.08 | 0.21 |
|  |  |  |  |  | A | 0.25 | 28.3 | 47.9 | 52.6 | 2.5 | | | |
| I-6 | 10.5 | 9.77 | 93.0 | 9.30 | I-6 | 0.5 | 72 | 64.7 | 66.6 | 0.85 | 0.43 | 0.70 | 0.20 |
|  |  |  |  |  | A | 0.5 | 31.2 | 45.1 | 55.3 | 1.4 | | | |
| I-7 | 14.7 | 16.91 | 115.0 | 11.50 | I-7 | 0.25 | 211 | 307 | 358 | 1.42 | 0.26 | 0.70 | 0.95 |
|  |  |  |  |  | A | 0.25 | 54.4 | 215 | 241 | 2.54 | | | |

TABLE 9

Pharmacokinetic data comparing compound A ("Cmpd. A," or "A") with derivatives (DV) II-2, II-5, II-6, I-10, and III-1

| Cmpd | Dose of Cmpd. A DV salt (mg/kg) | Actual Dose of Cmpd. A DV salt (mg/kg) | Accuracy Dose Formulation (%) | Actual Mol. Eq. dose of Cmpd. A (mg/kg) | Analyte | $T_{max}$ (hr) | $C_{max}$ (ng/mL) | $AUC_{last}$ (ng·hr/mL) | $AUC_{inf}$ (ng·hr/mL) | $T_{1/2}$ (hr) | Active/DV $C_{max}$ ratio | Active/DV $AUC_{last}$ ratio | DV/Cmpd. A Dosed AUClast ratio |
|---|---|---|---|---|---|---|---|---|---|---|---|---|---|
| Cmpd A | NA | NA | 118.0 | 11.80 | DV Cmpd. A (Active) | — 0.5 | — 149 | — 226 | — 229 | — 1.36 | NA | NA | NA |
| II-2 | 14.7 | 12.79 | 87.0 | 8.70 | II-2 A | 0.5 0.5 | 170 4.55 | 611 2.57 | 624 NR | 1.36 NR | 0.03 | 0.004 | 0.01 |
| II-5 | 17 | 18.70 | 110.0 | 11.00 | II-5 A | 0.25 | 61.2 NC (BLQ at all the time points) | 56.5 | NR | NR | 0.00 | 0.00 | 0.00 |
| II-6 | 14.4 | 11.23 | 78.0 | 7.80 | II-6 A | 0.25 0.25 | 752 34 | 531 29.9 | 548 30.7 | 0.85 0.75 | 0.05 | 0.06 | 0.13 |
| I-10 | 12 | 10.20 | 85.0 | 8.50 | I-10 A | 0.25 0.5 | 82.5 34.6 | 94.6 69.1 | 112 91.2 | 1.63 1.92 | 0.42 | 0.73 | 0.31 |
| III-1 | 23.4 | 19.89 | 85.0 | 8.50 | III-1 A | 0.25 | 238 NC (BLQ at all the time points) | 366 | 369 | 1.2 | 0.00 | 0.00 | 0.00 |

TABLE 10

Pharmacokinetic data comparing compound A ("Cmpd. A," or "A") with derivatives (DV) I-12, I-13, I-8, I-11.

| Cmpd | Dose of Cmpd. A DV salt (mg/kg) | Actual Dose of Cmpd. A DV salt (mg/kg) | Accuracy Dose Formulation (%) | Actual Mol. Eq. dose of Cmpd. A (mg/kg) | Analyte | $T_{max}$ (hr) | $C_{max}$ (ng/mL) | $AUC_{last}$ (ng·hr/mL) | $AUC_{inf}$ (ng·hr/mL) | $T_{1/2}$ (hr) | Active/DV $C_{max}$ ratio | Active/DV $AUC_{last}$ ratio | DV/Cmpd. A Dosed $AUC_{last}$ ratio |
|---|---|---|---|---|---|---|---|---|---|---|---|---|---|
| Cmpd A | NA | NA | 118.0 | 11.80 | DV Cmpd. A (Active) | — 0.5 | — 149 | — 226 | — 229 | — 1.36 | NA | NA | NA |
| I-12 | 15.1 | 12.23 | 81.0 | 8.10 | I-12 A | 0.5 0.5 | 67.6 79.5 | 68.9 102 | NR NR | NR NR | 1.18 | 1.48 | 0.45 |
| I-13 | 17.2 | 12.21 | 71.0 | 7.10 | I-13 A | 0.5 4 | 201 41.6 | 337 96.3 | NR NR | NR NR | 0.21 | 0.29 | 0.43 |
| I-8 | 11 | 8.14 | 74.0 | 7.40 | I-8 A | 0.5 0.5 | 32 7.15 | 48.5 39.3 | 72.4 NR | 2.12 NR | 0.22 | 0.81 | 0.17 |
| I-11 | 14.8 | 10.36 | 70.0 | 7.00 | I-11 A | 0.25 0.25 | 27.7 35.8 | 39.7 128 | 44 151 | 1.16 2.78 | 1.29 | 3.22 | 0.57 |

What is claimed is:

1. An isoindoline derivative of Formula I, or a stereoisomer or a pharmaceutically acceptable salt thereof:

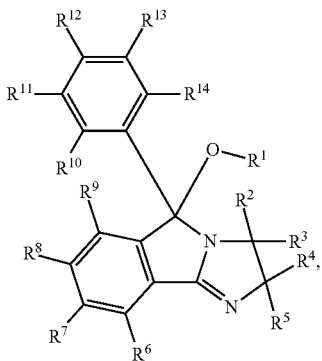

(I)

wherein:
$R^1$ comprises a dioxolanylmethyl group;
and
$R^2$-$R^5$ are each independently H or alkyl;
$R^6$-$R^{11}$, $R^{13}$ and $R^{14}$ are each independently H, alkyl, alkoxy, F, Cl, Br, $CF_3$ or I, and
$R^{12}$ is alkyl, alkoxy, F, Cl, Br, $CF_3$ or I.

2. An isoindoline derivative, wherein the isoindoline derivative is:

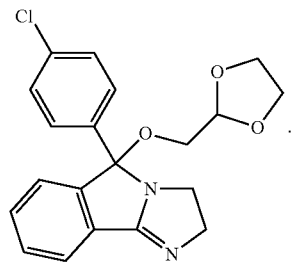

(I-19)

or a stereoisomer or a pharmaceutically acceptable salt thereof.

3. An isoindoline derivative, wherein the isoindoline derivative is selected from the group consisting of:
5-(benzyloxy)-5-(4-chlorophenyl)-2,5-dihydro-3H-imidazo[2,1-a]isoindole (I-1),
5-(4-chlorophenyl)-5-((4-methoxybenzyl)oxy)-2,5-dihydro-3H-imidazo[2,1-a]isoindole (I-2),
5-(allyloxy)-5-(4-chlorophenyl)-2,5-dihydro-3H-imidazo[2,1-a]isoindole (I-3),
5-(4-chlorophenyl)-5-(2-methoxyethoxy)-2,5-dihydro-3H-imidazo[2,1-a]isoindole (I-4),
methyl 2-((5-(4-chlorophenyl)-2,5-dihydro-3H-imidazo[2,1-a]isoindol-5-yl)oxy)acetate (I-5),
5-(benzo[d][1,3]dioxol-5-ylmethoxy)-5-(4-chlorophenyl)-2,5-dihydro-3H-imidazo[2,1-a]isoindole (I-7),
5-(4-chlorophenyl)-5-((3-methylbut-2-en-1-yl)oxy)-2,5-dihydro-3H-imidazo[2,1-a]isoindole (I-9),
(E)-5-(4-chlorophenyl)-5-((3,7-dimethylocta-2,6-dien-1-yl)oxy)-2,5-dihydro-3H-imidazo[2,1-a]isoindole (I-11),
5-(4-chlorophenyl)-5-(2-(2-(2-methoxyethoxy) ethoxy) ethoxy)-2,5-dihydro-3H-imidazo[2,1-a]isoindole (I-12),
5-(4-chlorophenyl)-5-(((2E,6E)-3,7,11-trimethyldodeca-2,6,10-trien-1-yl)oxy)-2,5-dihydro-3H-imidazo[2,1-a]isoindole (I-13),
5-(4-chlorophenyl)-5-((4-(trifluoromethyl)benzyl)oxy)-2,5-dihydro-3H-imidazo[2,1-a]isoindole (I-14),
5-(4-chlorophenyl)-5-((3,4-dimethoxybenzyl)oxy)-2,5-dihydro-3H-imidazo[2,1-a]isoindole (I-15),
5-((4-chlorobenzyl)oxy)-5-(4-chlorophenyl)-2,5-dihydro-3H-imidazo[2,1-a]isoindole (I-16),
(E)-5-(4-chlorophenyl)-5-((4-methylpent-2-en-1-yl)oxy)-2,5-dihydro-3H-imidazo[2,1-a]isoindole (I-17),
(E)-5-(4-chlorophenyl)-5-((3-(4-(trifluoromethyl)phenyl) allyl)oxy)-2,5-dihydro-3H-imidazo[2,1-a]isoindole (I-18),
5-((1,3-dioxolan-2-yl) methoxy)-5-(4-chlorophenyl)-2,5-dihydro-3H-imidazo[2,1-a]isoindole (I-19),
(E)-5-((3-(benzo[d][1,3]dioxol-5-yl) allyl)oxy)-5-(4-chlorophenyl)-2,5-dihydro-3H-imidazo[2,1-a]isoindole (I-20),
5-(4-chlorophenyl)-5-(cinnamyloxy)-2,5-dihydro-3H-imidazo[2,1-a]isoindole (I-21),
(E)-5-(4-chlorophenyl)-5-((3-(4-fluorophenyl) allyl)oxy)-2,5-dihydro-3H-imidazo[2,1-a]isoindole (I-22), and
(E)-5-(4-chlorophenyl)-5-((3-(4-chlorophenyl) allyl)oxy)-2,5-dihydro-3H-imidazo[2,1-a]isoindole (I-23);
or a stereoisomer or a pharmaceutically acceptable salt thereof.

4. A composition comprising the isoindoline derivative of claim 1, and a pharmaceutically acceptable excipient.

5. The isoindoline derivative of claim 1, wherein $R^{12}$ is Cl.

* * * * *